United States Patent [19]

Yamamoto

[11] Patent Number: 5,701,229
[45] Date of Patent: Dec. 23, 1997

[54] STATION DEVICE TO WHICH IS CONNECTED AN ELECTRONIC APPARATUS SUCH AS TAPE RECORDER

[75] Inventor: Haunori Yamamoto, Saitama, Japan

[73] Assignee: Sony Corporation, Tokyo, Japan

[21] Appl. No.: 633,530

[22] Filed: Apr. 17, 1996

[30] Foreign Application Priority Data

Apr. 21, 1995 [JP] Japan .................. P07-097269

[51] Int. Cl.$^6$ .................. H02B 1/14; H01R 13/62
[52] U.S. Cl. .................. 361/617; 361/737; 361/740; 439/136; 439/298
[58] Field of Search .................. 361/737, 684, 361/686, 617, 725–736, 738–759; 235/441, 492; 200/50.22, 50.26; 439/297, 298, 374, 377, 136, 140

[56] References Cited

U.S. PATENT DOCUMENTS

| | | | |
|---|---|---|---|
| 4,600,257 | 7/1986 | Fushimoto | 361/684 |
| 4,767,348 | 8/1988 | Murakami | 439/140 |
| 4,843,226 | 6/1989 | Kato et al. | 235/492 |
| 4,961,710 | 10/1990 | Komatsu | 439/267 |
| 5,036,430 | 7/1991 | Hills | 361/684 |
| 5,196,687 | 3/1993 | Sugino et al. | 235/441 |
| 5,202,551 | 4/1993 | Parrer et al. | 235/441 |
| 5,223,995 | 6/1993 | Sasaya | 360/96.5 |

Primary Examiner—Bot L. Ledynh
Assistant Examiner—John B. Vigushin
Attorney, Agent, or Firm—Jay H. Maioli

[57] ABSTRACT

Electronic apparatus such as a tape recorder, a disc player or a radio receiver is connected to a station device. The electronic apparatus has a terminal portion for connection to the station device, an opening/closing unit for opening or closing the terminal portion, and a lock unit for locking the opening/closing unit in the closed position. The station device includes a main body having a loading portion for loading the electronic apparatus and an input/output unit for data input/output at least between the electronic apparatus loaded on the loading portion and external equipment. A connector is provided on the loading portion and adapted to be connected to the terminal portion of the electronic apparatus. A detection unit for detects the loading of the electronic apparatus on the loading portion. An actuation unit release the locked state of the opening/closing unit and moves the opening/closing unit to open the terminal portion. A lift unit moves the connection unit between an upper position connecting to the terminal portion of the electronic apparatus and a lower position disconnected from the terminal portion. The lift unit is operatively associated with movement of the opening/closing unit in the opening direction for raising the connection portion for connection to the terminal portion.

13 Claims, 27 Drawing Sheets

STATION DEVICE TO WHICH IS CONNECTED AN ELECTRONIC APPARATUS SUCH AS TAPE RECORDER

BACKGROUND OF THE INVENTION

1. Field of the Invention

This invention relates to a station device to which is connected an electronic apparatus, such as a tape recorder, a disc player or a radio receiver. More particularly, it relates to such station device employed for exchanging signals between external equipment and an electronic apparatus and for supplying power to the electronic apparatus.

2. Description of the Related Art

Different kinds of electronic apparatus, such as a tape recorder, disc player or radio receiver, are in widespread use. Among such electronic apparatus, there is one which is supplied with power from external equipment via connection means, such as connection jacks fitted to an outer casing, and which is adapted for exchanging information with the external equipment. To the connection jacks, making up connection means, a connection plug fitted to the distal end of the connection cord is connected. The electronic apparatus is connected by the connection cord to the external equipment.

There has been proposed a station device for facilitating the connection between the electronic apparatus and the external equipment. Such station device includes a loading unit for mechanically holding the electronic apparatus. On the loading unit is mounted a connection terminal connected to a contact provided on a connection plug. That is, the electronic apparatus is loaded on the loading unit of the station device so that the connection terminal is connected to the contact for power supply from outside and for exchange of information signals with the external equipment.

In the above electronic apparatus and the station device, the contact or the connection terminal cannot be protected sufficiently, especially if the electronic apparatus and the station device are not connected to each other. That is, the contact or the connection terminal tends to be contacted by hand, finger or external objects, so that it is liable to be worn out or destroyed. In addition, if the hand or finger is contacted with the contact or the connection terminal, the electronic apparatus, station device or the inner circuitry of the station device connected to the station device tends to be electrostatically destroyed.

In addition, in the above electronic apparatus or station device, the electronic apparatus cannot be sufficiently protected from becoming loaded in a tilted condition with respect to the station device. If the electronic apparatus is loaded on the station device in a mistaken loading position, the contact or the connection terminal is excessively loaded, as a result of which the contact or the connection terminal tends to be destroyed.

SUMMARY OF THE INVENTION

It is therefore an object of the present invention to provide a station device wherein the connection terminal connected to a contact of the electronic apparatus may be sufficiently protected, the inner circuitry mat be reliably protected from electrostatic destruction and wherein the electronic apparatus may be reliably prohibited from being loaded in an incorrect condition, such as in a tilted condition.

In one aspect, the present invention provides a station device for an electronic apparatus having a terminal portion for connection to the station device, opening/closing means for opening or closing the terminal portion, and locking means for locking the opening/closing means at a position of closing the terminal portion. The station device includes a main body having a loading portion for loading the electronic apparatus therein and having input/output means for data input/output at least between the electronic apparatus loaded on the loading portion and an external equipment. The station device also includes a connection portion provided on the loading portion and adapted to be connected to the terminal portion of the electronic apparatus, and detection means for detecting the loading of the electronic apparatus on the loading portion. The station device further includes actuation means for releasing, by the detection means, the locked state of the opening/closing means of the electronic apparatus by the locking means, for moving the opening/closing means in a direction of opening the opening/closing means for opening the terminal portion, and lift means for raising/lowering the connection means between an upper position connecting to the terminal portion of the electronic apparatus and a lower position disconnected from the terminal portion. The lift means is operatively associated with movement of the opening/closing means of the electronic apparatus in the opening direction by the actuation means for raising the connection portion to a position of being connected to the terminal portion.

Preferably, the actuation means includes a movement member (slider) moved by the detection means for causing a forward movement of the opening/closing means of the electronic apparatus in a direction of opening the terminal portion.

Preferably, release operating means is provided for causing backward movement of a first movement member. The release operating means causes backward movement of the movement member for moving the connecting portion to the lower position by the lift means.

Preferably, when the release operating means is actuated for causing backward movement of the movement member, the movement member is held at the backward movement terminal position by the detection member.

Preferably, the detection means includes at least one detection member (spring plate and so forth) rotated by the loading of the electronic apparatus on the loading portion. Preferably, the detection member includes an actuated portion (detection plate) thrust and actuated by the electronic apparatus and a holding portion (retention pawl) engaged with the movement member for holding the movement member at the backward movement terminal position.

Preferably, other opening/closure means for opening/closing the connection portion is provided for being actuated by the forward movement of the actuating means in a direction of opening the connection portion.

In another aspect, the present invention provides an electronic apparatus including a terminal portion provided on a main body of the apparatus and adapted to be connected to a connecting portion of a device on which the electronic apparatus is loaded, an aperture formed in the main body of the apparatus for exposing the terminal portion to outside, opening/closing means for opening/closing the aperture slidable between a position of opening the aperture and a position of closing the aperture with respect to the main body of the apparatus and locking means for locking the opening/closing means at a position closing the aperture.

Preferably, the electronic apparatus further includes an internal power source (primary cell or a secondary cell), a power source terminal supplied with electric power from outside, and switching means for switching from the internal power source to an external power source connected to the power source terminal when the opening/closing means is moved to a position of closing the aperture.

DESCRIPTION OF THE PREFERRED EMBODIMENTS

Figure 1:
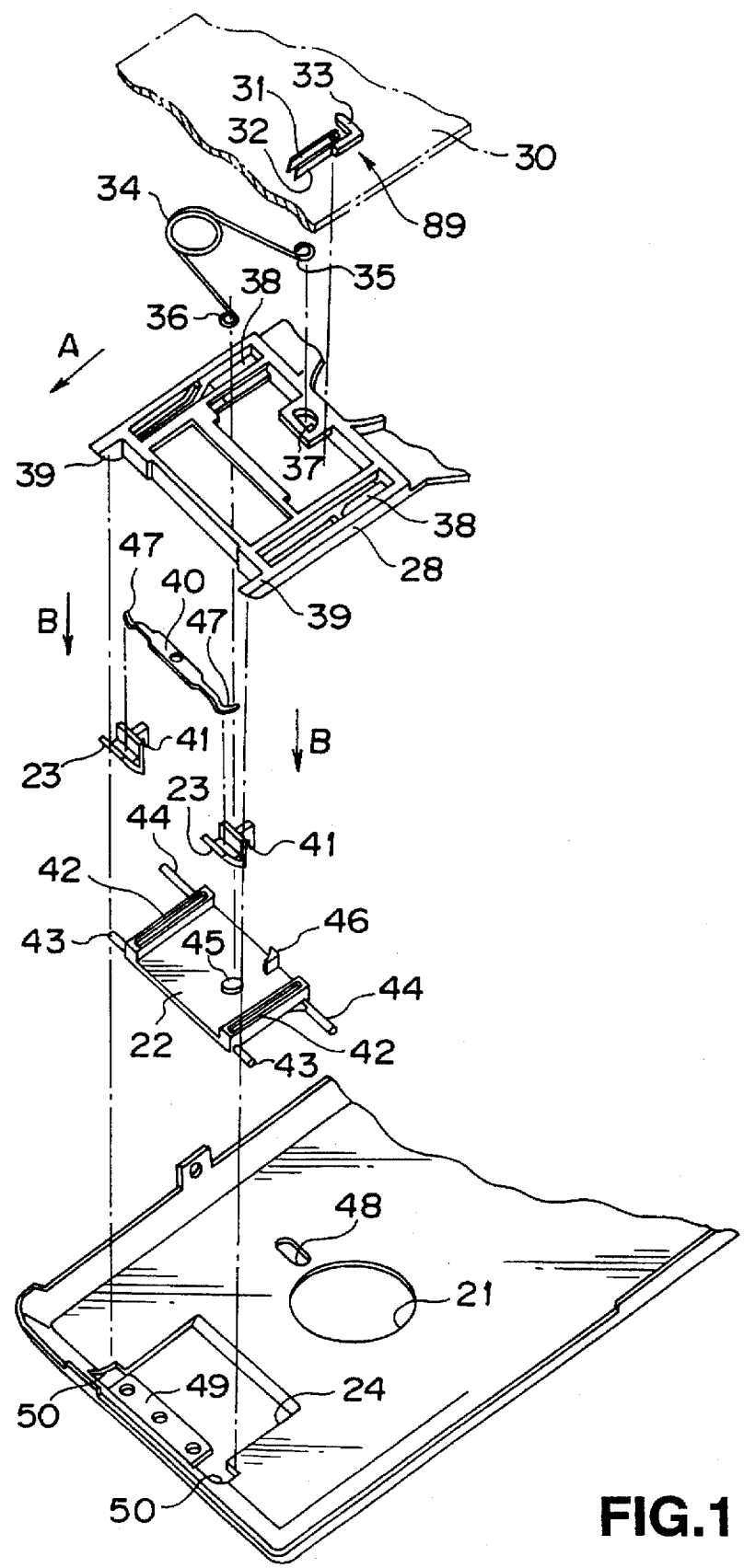
FIG. 1 is an exploded perspective view showing the construction of essential portions of an electronic apparatus connected to a station device according to the present invention.
Figure 2:
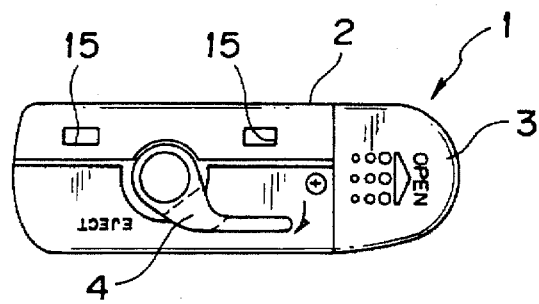
FIG. 2 is a right side view showing an arrangement of the electronic apparatus.
Figure 3:
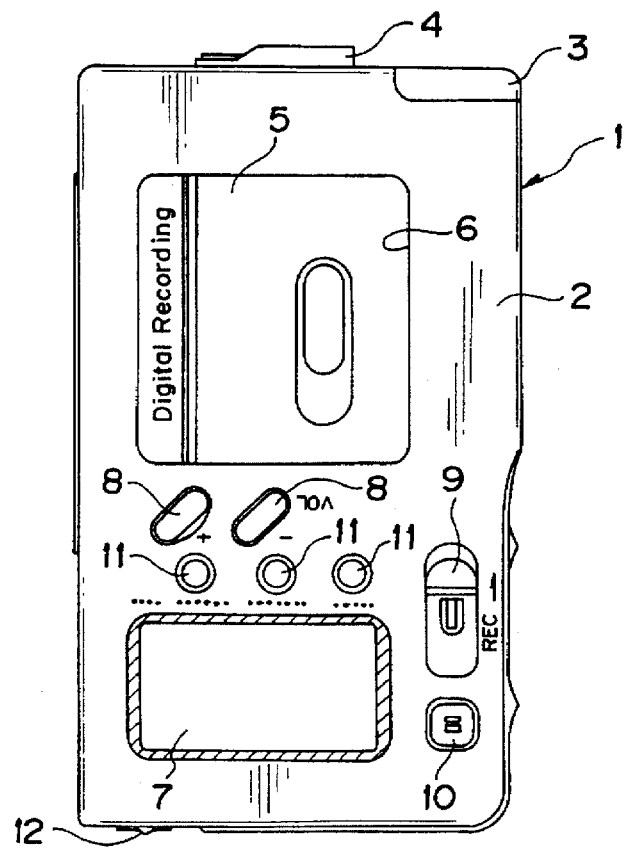
FIG. 3 is a plan view showing the arrangement of the electronic apparatus.
Figure 4:
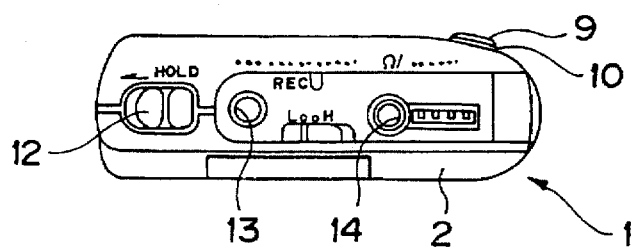
FIG. 4 is a left side view showing the arrangement of the electronic apparatus.
Figure 5:
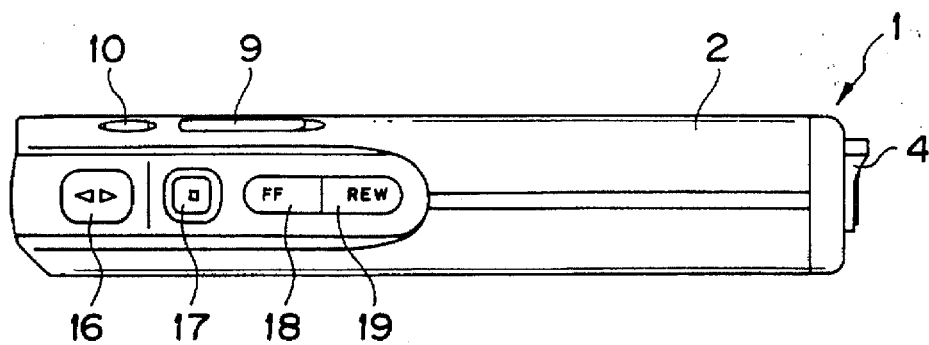
FIG. 5 is a front view showing the arrangement of the electronic apparatus.
Figure 6:
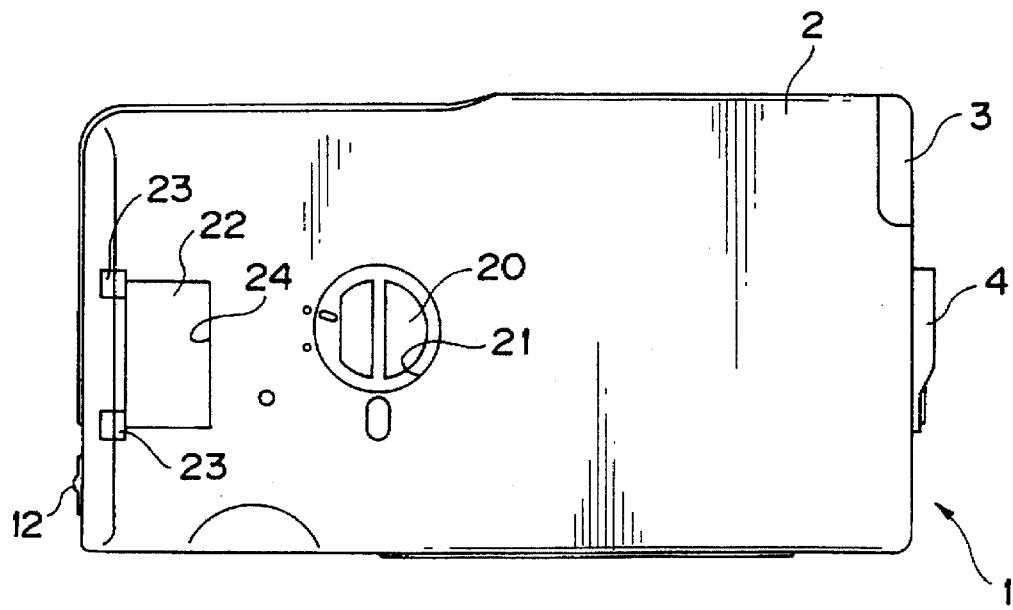
FIG. 6 is a bottom view showing the arrangement of the electronic apparatus.
Figure 7:
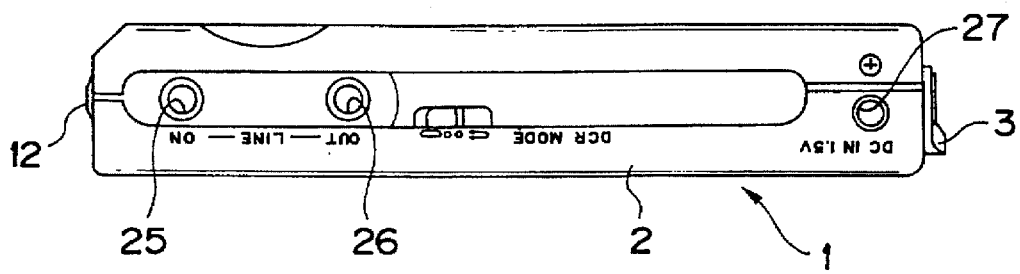
FIG. 7 is a back-side view showing the arrangement of the electronic apparatus.
Figure 8:
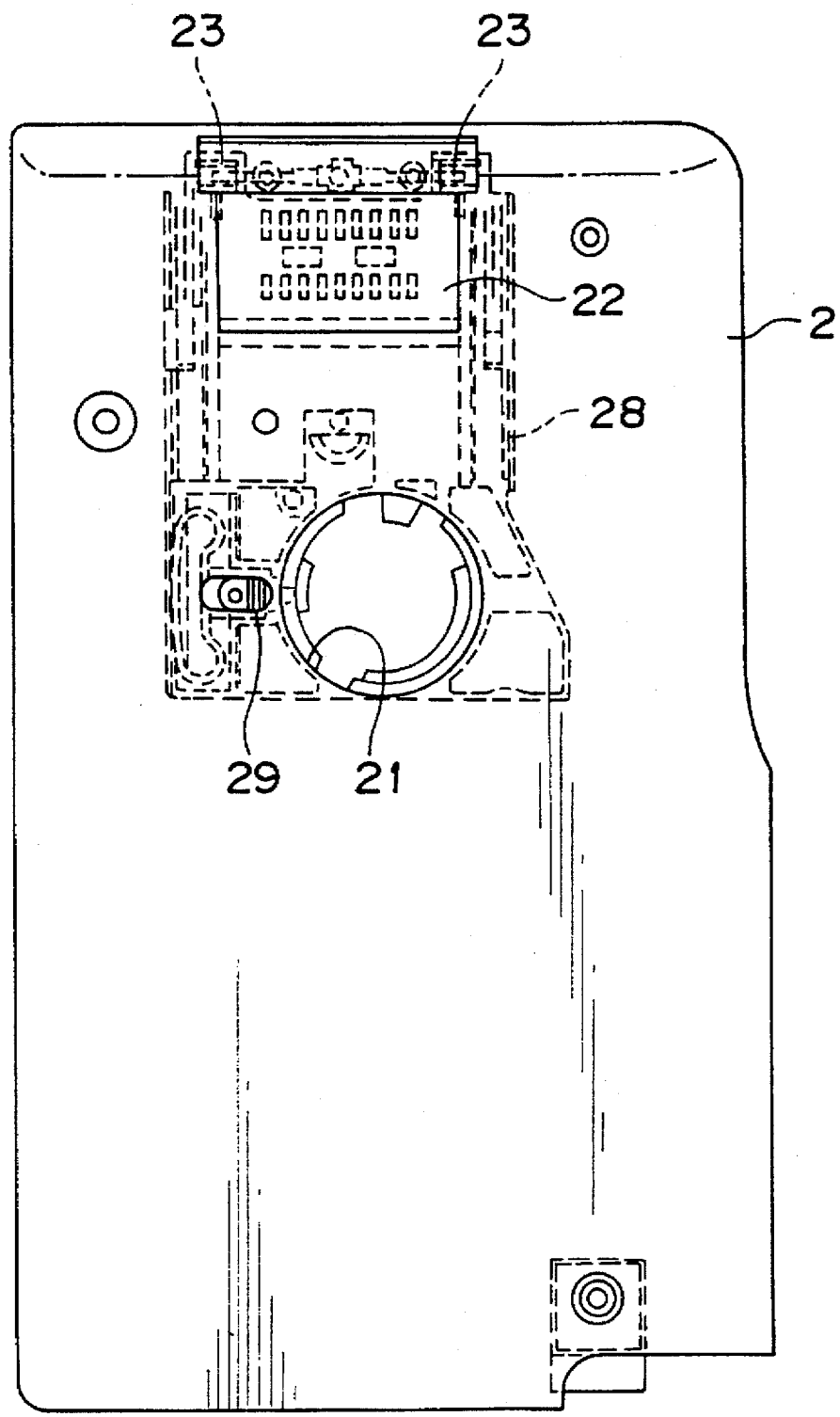
FIG. 8 is a bottom view showing the structure of a bottom portion of an outer casing of the electronic apparatus in phantom.
Figure 9:
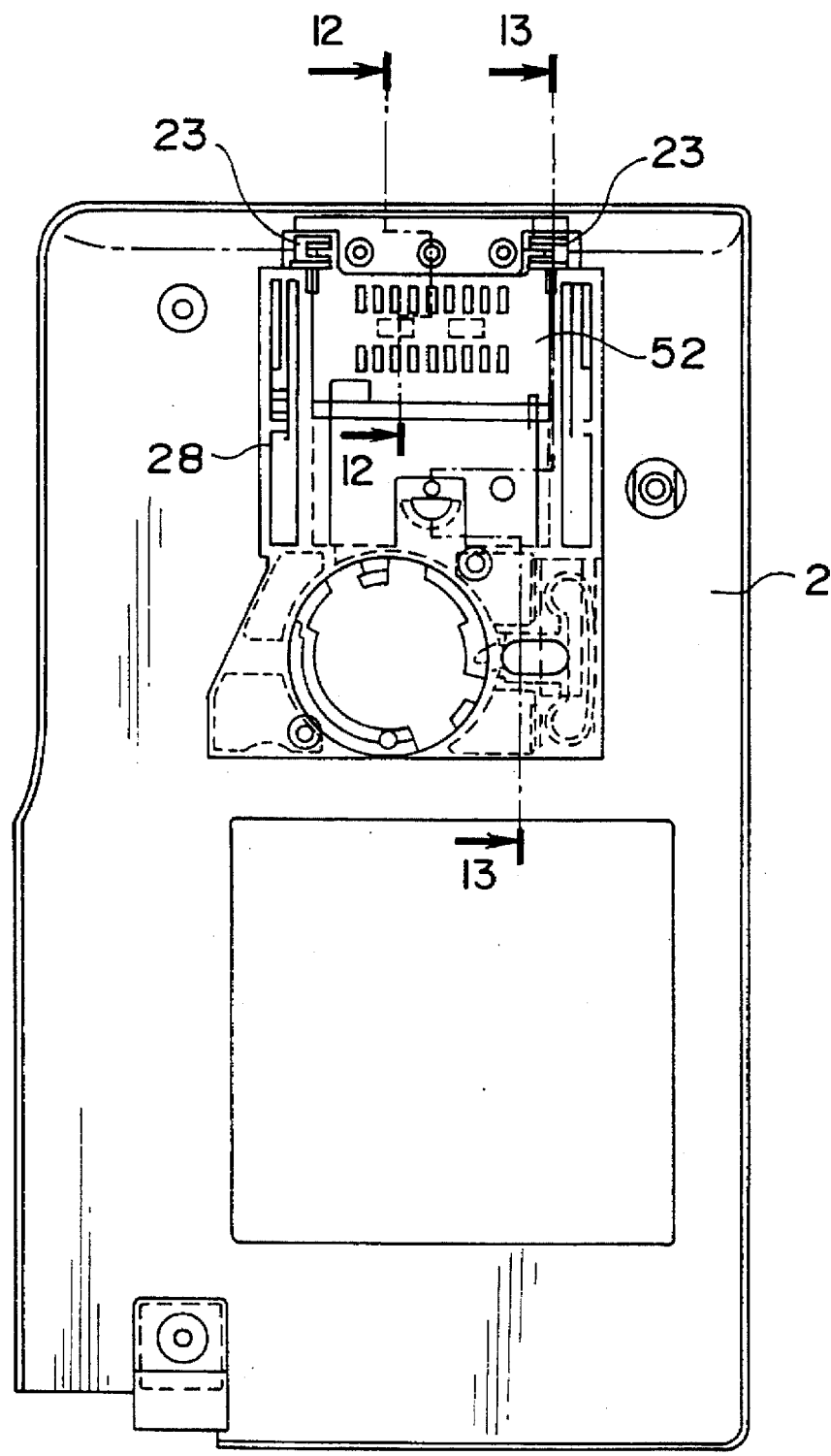
FIG. 9 is a plan view showing the structure of the bottom portion of the outer casing of the electronic apparatus.
Figure 10:
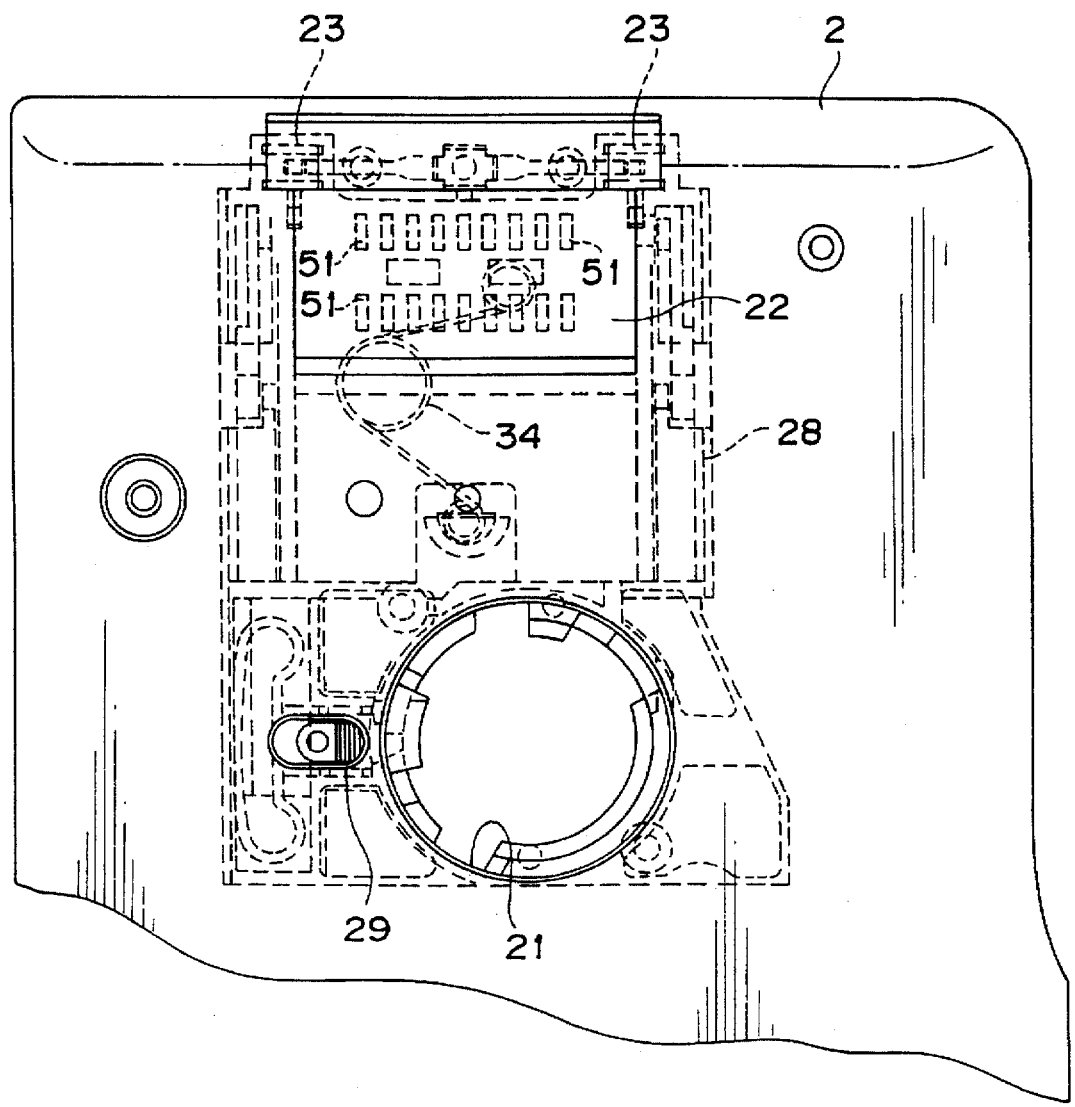
FIG. 10 is an enlarged bottom view showing the structure of essential portions of the bottom portion of the outer casing of the electronic apparatus in phantom.
Figure 11:
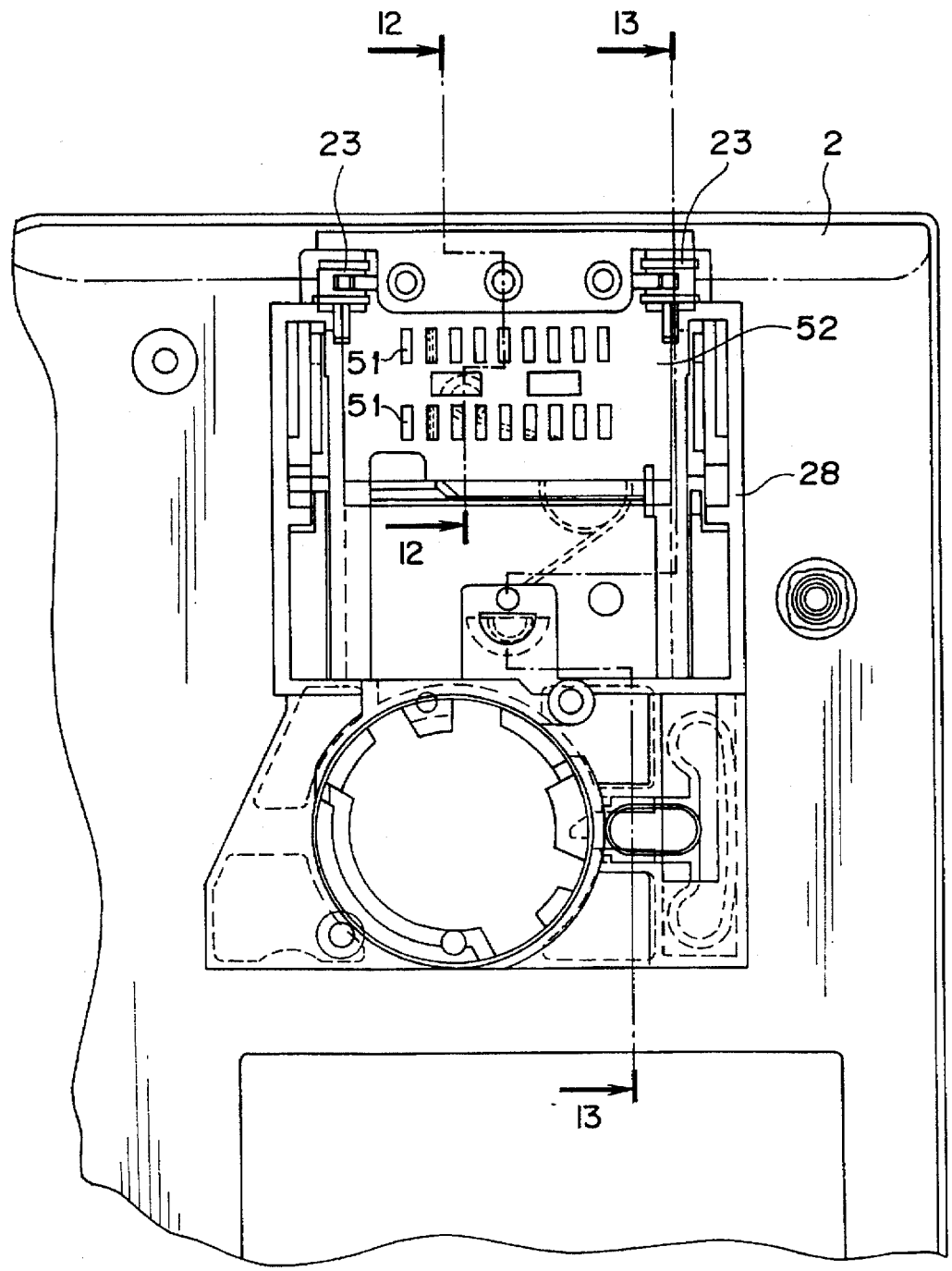
FIG. 11 is an enlarged plan view showing the structure of essential portions of the bottom portion of the outer casing of the electronic apparatus.
Figure 12:
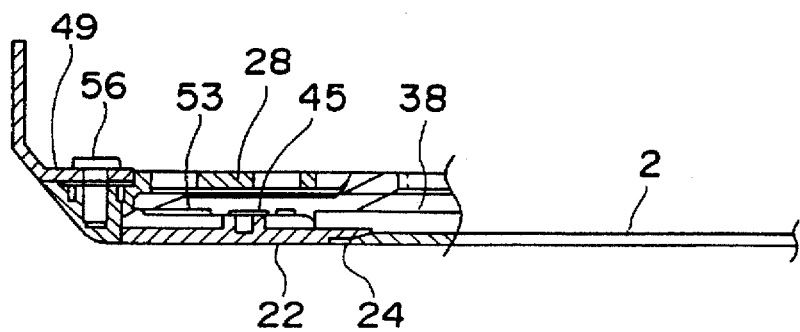
FIG. 12 is an enlarged longitudinal cross-sectional view, taken along line 12—12 in FIGS. 9 and 11, and showing the structure of essential portions of the bottom portion of the outer casing of the electronic apparatus.
Figure 13:
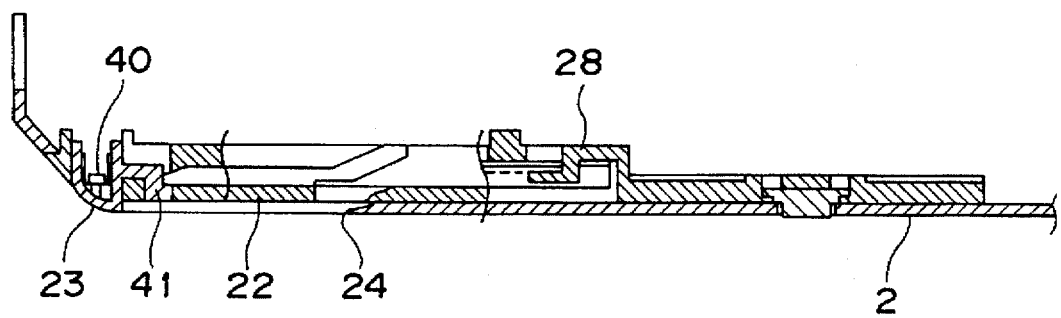
FIG. 13 is an enlarged longitudinal cross-sectional view, taken along line 13—13 in FIGS. 9 and 11, and showing the structure of essential portions of the bottom portion of the outer casing of the electronic apparatus.

Referring to the drawings, preferred embodiments of the present invention will be explained in detail.

In the present embodiment, the station device according to the present invention is arranged as an apparatus to which is connected a digital tape recorder.

The digital tape recorder has an outer casing 2 the upper surface of which has a tape cassette insertion opening 6 via which to insert or eject a tape cassette, not shown, as shown in FIGS. 2 to 7. This tape caseate insertion opening 6 may be closed and opened by a lid 5 rotatably mounted on the outer casing 2. Within the outer casing 2 is enclosed a tape driving unit which is disposed inside of the insertion opening 6 and on which the tape cassette is loaded so that digital information signals will be recorded on or reproduced from a magnetic tape disposed in the tape cassette. The tape cassette, loaded on the tape driving unit, may be taken out via the tape cassette insertion opening 6 by rotating an ejection lever 4 rotatably mounted on the right side section of the outer casing 2. Within the outer casing 2 is enclosed an electronic circuit for controlling the operation of the tape driving unit.

On the upper surface of the outer casing 2 is arranged a display unit 7 which is provided with a display device, such as a liquid crystal display plate (LCD) and which is controlled by the electronic circuit for displaying the information conforming to the operational mode of the tape driving unit.

On the upper surface of the outer casing 2 are arranged plural pushbutton switches 8, 10, 11 and a slide switch 9. On the front surface of the outer casing 2 are arranged plural pushbutton switches 16 to 19. The pushbutton switches 8, 8 on the upper surface of the outer casing 2 are volume switches for adjusting the level of the playback output of the tape recorder. The pushbutton switch 10 on the upper surface of the outer casing 2 is a pause switch for transiently halting the operation of the tape driving unit. The pushbutton switches 11, 11, 11 on the upper surface of the outer casing 2 are switches for selecting the display contents in the display device 7. The slide switch 10 on the upper surface of the outer casing 2 is a recording start switch for starting the recording mode.

The pushbutton 16 on the front surface of the outer casing 2 is a playback start button for starting the playback mode or switching the tape running direction during playback. The pushbutton switch 17 on the front surface of the outer casing 2 is a stop switch for halting the operation of the tape driving unit. The pushbutton switch 18 on the front surface of the outer casing 2 is a fast forward (FF) switch for starting the fast forward mode. The pushbutton switch 19 on the front surface of the outer casing 2 is a rewind (RW) switch for starting the rewind mode.

On the left side surface of the outer casing 2 are mounted connection jacks 13, 14 configured for connecting a microphone device or a headphone device to the tape recorder.

On the bottom surface of the outer casing 2 towards its lateral side, that is towards its left side, is formed an aperture 24. Plural contacts 51 for connection to an external equipment are provided on the outer casing within the aperture 24, as shown in FIGS. 8 to 11. That is, the contacts are exposed to the outside of the outer casing 2 via the aperture 24.

The aperture 24 is adapted to be opened or closed by a slide shutter 22 slidably supported with respect to the outer casing 2, as shown in FIG. 1.

The slide shutter 22 is supported by being sandwiched between a bottom plate of the outer casing 2 and a frame 28 mounted on the inner lateral side of the outer casing 2, as shown in FIGS. 8 to 13. The slide shutter 22 is slidable in the fore-and-aft direction, that is in a direction from a lateral side to the opposite lateral side of the tape recorder, between a position of closing the aperture 24 and a position of opening the aperture 24.

Figure 14:
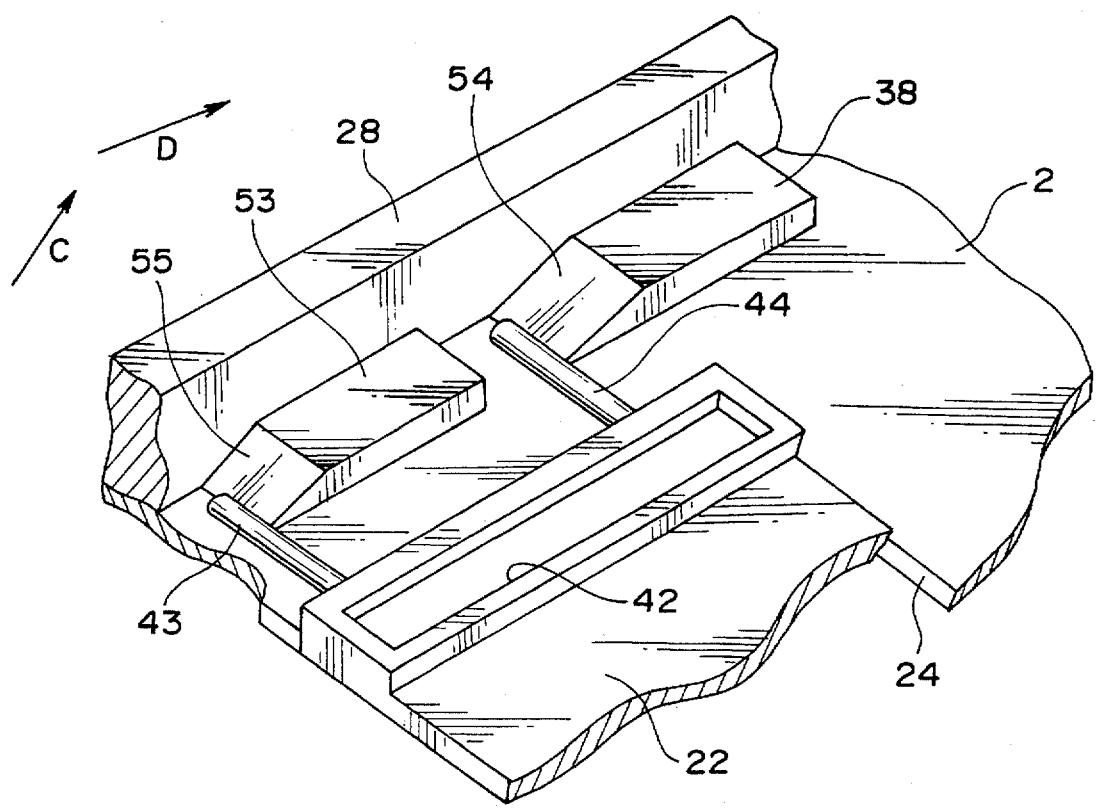
FIG. 14 is an enlarged perspective view showing the structure of essential portions of the bottom portion of the outer casing of the electronic apparatus.

On the slide shutter 22 are formed a forward side pair of supporting rods 43, 44 and a rear side pair of supporting arms 43, 44, protuberantly formed on both lateral sides relative to the sliding direction of the slide shutter with respect to the outer casing 2. These supporting rods 43, 44, 43, 44 are intruded into a space between the outer casing 2 and the frame 28. When the slide shutter 22 is in an aperture closure position, it closes the aperture 24 with its outer lateral surface flush with the bottom surface of the outer casing 2. When the slide shutter 22 is slid to an aperture opening position, it is moved more inwardly into an inner side of the outer casing 2 relative to the direction perpendicular to the sliding direction of the slide shutter 22 than when it is in the aperture closure position. That is, the frame 28 is provided with guide pieces 53, 38, 53, 38, in association with the supporting rods 43, 44, 43, 44, so that, when the slide shutter 22 is in the closure position, the guide pieces are positioned at the back of the supporting rods 43, 44, 43, 44, respectively, as shown in FIG. 14. The forward end portions of these guide sections 53, 38, 53, 38 are formed as inclined surfaces 54, 55, 54, 55, respectively.

When the slide shutter 22 is slid from the aperture closing position to the aperture opening position, that is towards the rear, the supporting rods 43, 44, 43, 44 are slid on the inclined surfaces 55, 54, 55, 54, as indicated by arrow D in FIG. 14, so as to ride on the guide pieces 53, 38, 53, 38 and to travel on the inner side of the outer casing 2, as indicated by arrow D in FIG. 14. Thus, the slide shutter 22 first moves towards the inside of the outer casing 2, away from the aperture 24, before opening the aperture 24.

The slide shutter 22 is biased by a torsion coil spring 34 in the aperture closing direction, as indicated by arrow A in FIG. 1. This torsion coil spring 34 has its arm 38 retained by a retention boss 45 formed on the slide shutter 22 for being protruded towards the inner side of the outer casing 2, while having its other arm 35 retained by a retainer 37 provided on the frame 28.

The slide shutter 22 is retained in the closure position by a pair of lock members 23, 23. These lock members 23, 23 are supported by guide portions 39, 39 formed in the vicinity of one end portion of the outer casing 2 in a direction towards and away from the bottom plate of the outer casing 2, that is in the up-and-down direction. These lock members 23, 23 are positioned at the initial position by being biased in a direction towards the outer side of the outer casing 2, that is downward, as indicated by arrow B in FIG. 1, by arm portions 47, 47 on both lateral sides of a spring plate 40 mounted on a supporting piece 49 protuberantly formed on a lateral side of the outer casing 2. The rear sides of the lock members 23, 23 are formed as lock pawls 41, 41. The lock members 23, 23 lock the slide shutter 22 in the aperture closure position by having these lock pawls 41, 41 retained in mating grooves 42, 42 formed on inner lateral sides of the outer casing 2. That is, the lock members 23, 23 retain two points of the slide shutter 22 on both lateral sides on the forward edge thereof.

The lock members 23, 23 are moved upwards in a direction away from the bottom plate of the outer casing 2 against the bias of the arm portions 47, 47 of the spring plate 40 for releasing the retention of the slide shutter 22 by the lock pawls 41, 41 for enabling the slide shutter 22 to be slid in the aperture opening direction. The lower surfaces of the lock members 23, 23 are exposed to the outside via widened portions 50, 50 formed by cutting off side portions of the aperture 24 along a lateral side of the outer casing 2. The lower surfaces of the lock members 23, 23 are tapered downwards along the lower edge of the end of the outer casing 2. That is, the lock members 23, 23 are moved upwards by being thrust horizontally from the lateral side of the outer casing 2.

When the slide shutter 22 is slid in the aperture opening position, the slide shutter 22 actuates a switch 89 adapted for switching between the state in which electric power is supplied from the outer side of the outer casing 2 via each contact 51 and the state in which the electric power is supplied from an enclosed power source provided in the outer casing 2 so that the power will be supplied via each contact 51. The slide shutter 22 is provided with a switch actuating protrusion 46 extending towards the interior of the outer casing 2. The switch actuating protrusion 46 faces a printed circuit board 30 provided within the outer casing 2. The switch 89 is arranged on the printed circuit board 30. The switch 89 is provided with a pair of terminal plates 31, 32 in the form of spring plates connected to a conductor pattern on the printed circuit board 30. The switch is set to the turn-on state by distal ends of the terminal plates 31, 32 being in contact with each other. In this switch 89, the distal ends of the terminal plates 31, 32 are contacted in the initial state with each other. An actuated member 33 is mounted on distal ends of the terminal plates 31, 32. The actuated member 33 is disposed on a locus of movement of the switch actuation protrusion 46 produced by sliding of the slide shutter 22 towards the aperture opening position. When the slide shutter 22 is slid towards the aperture opening position, the actuated member 33 is thrust by the switch actuation protrusion 46 for separating the distal ends of the terminal plates 31, 32 from each other.

Figure 15:
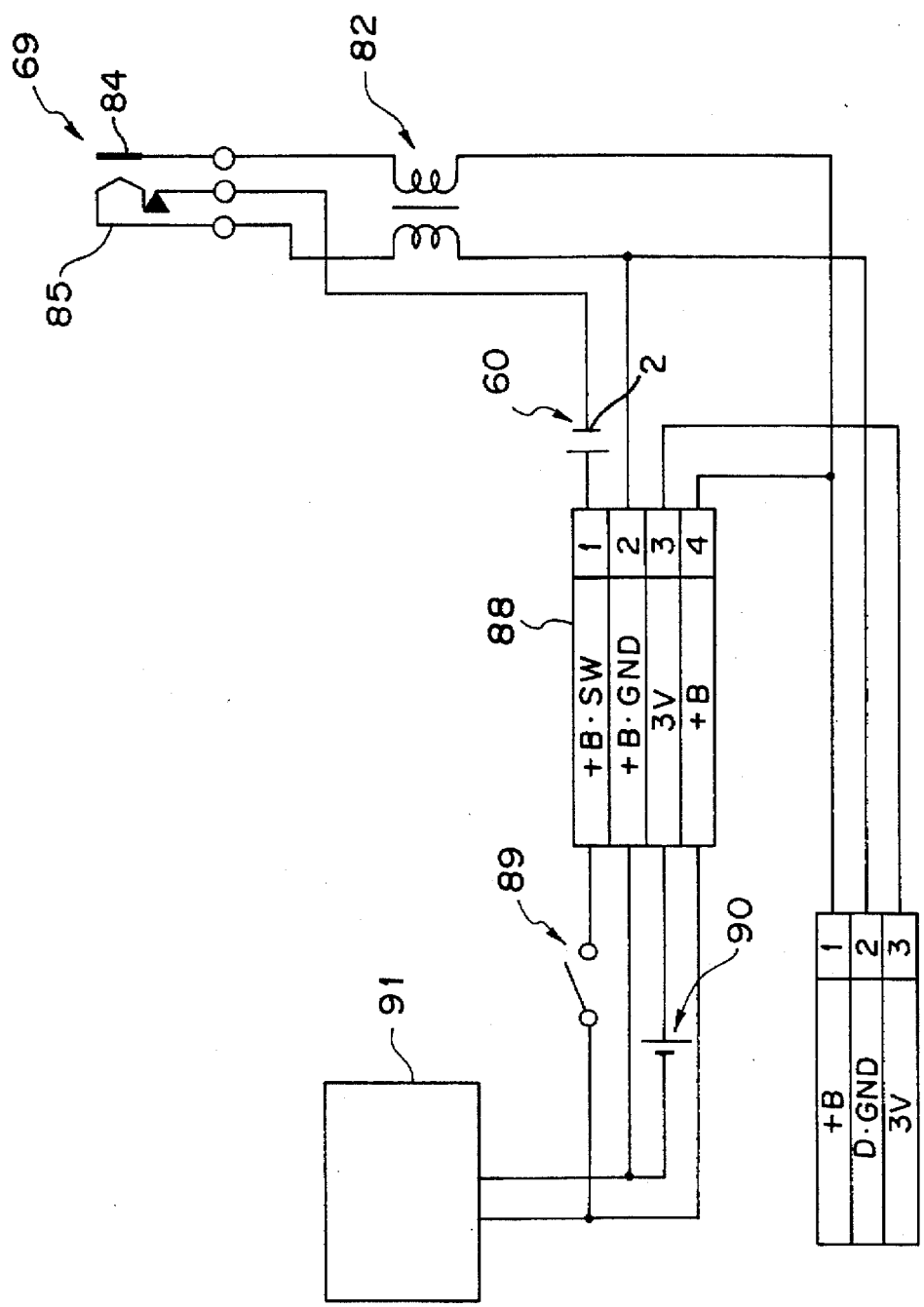
FIG. 15 is a circuit diagram showing essential portions of the electronic circuit of the electronic apparatus.

With the present tape recorder, the dc power is supplied from outside via the external power source jack 69, as shown in FIG. 15. The external power source jack 69 has a plus terminal 84 connected via a line filter 82 to a +B portion of a power source substrate 88. The external power source jack 69 has a minus terminal 85 connected via the line filter 82 to a +B.GND portion of a power source substrate 88. The +B portion and the +B.GND portion are respectively connected to an electronic circuit 91 for supplying the current thereto. To the minus terminal 85 of the external power source jack 69 is connected a negative electrode 2 of a dry cell 60 operating as an enclosed power source. The dry cell 60 has a positive electrode connected to a B.SW portion of the power source substrate 88. This +B.SW portion is connected via the switch 89 to the electronic circuit 91. Thus, when the switch 89 is turned on, the power from the dry cell 60 is supplied to the electronic circuit 91, whereas, if the switch 89 is in the turn-off state, the power from the dry cell 60 is interrupted and only the power supplied via the external power source jack 69 is supplied to the electronic circuit 91. A secondary cell 90 is connected between the +B.GND and a 3V portion of the power source terminal 88. This secondary cell 90 furnishes the power required during the non-operating time of the digital tape recorder, such as during memory refreshment or driving a timepiece.

The tape recorder is connected to the station device via the contact 51. The station device has a casing 102, as shown in FIGS. 16 to 21. On the upper surface of the casing 102 is formed a loading portion 109 formed as a recess into which the tape recorder 1 is fitted in a horizontal position. On the inner wall on the opposite side in the loading unit 109 are protuberantly formed a pair of engagement portions 111, 111. When the outer casing 2 is fitted on the loading portion 109 from the opposite lateral side of the outer casing 2, the engagement portions are engaged in a pair of engagement holes 15, 15 formed on the opposite lateral side.

The casing 102 is formed with a wall section which is disposed in the vicinity of the loading unit 109 and which is adapted for concealing the connection jacks 13, 14 provided on the outer lateral side of the tape recorder 1 when the tape recorder 1 is set in position with respect to the loading portion 109.

Within the casing 102 is fixedly mounted a chassis 121, as shown in FIGS. 21 to 29. On the chassis 121 is slidably mounted a slider 175 for sliding from a lateral side towards the opposite lateral side of the station device 101. That is, the slider 175 has a pair of supporting slits 176, 178 on its lateral side and another pair of supporting slits 176, 178 on its opposite lateral side. In these supporting slits 176, 178 are inserted support pins 127, 128 set on the chassis 121 in order to permit the slide 175 to slide on the chassis 121.

Figure 26:
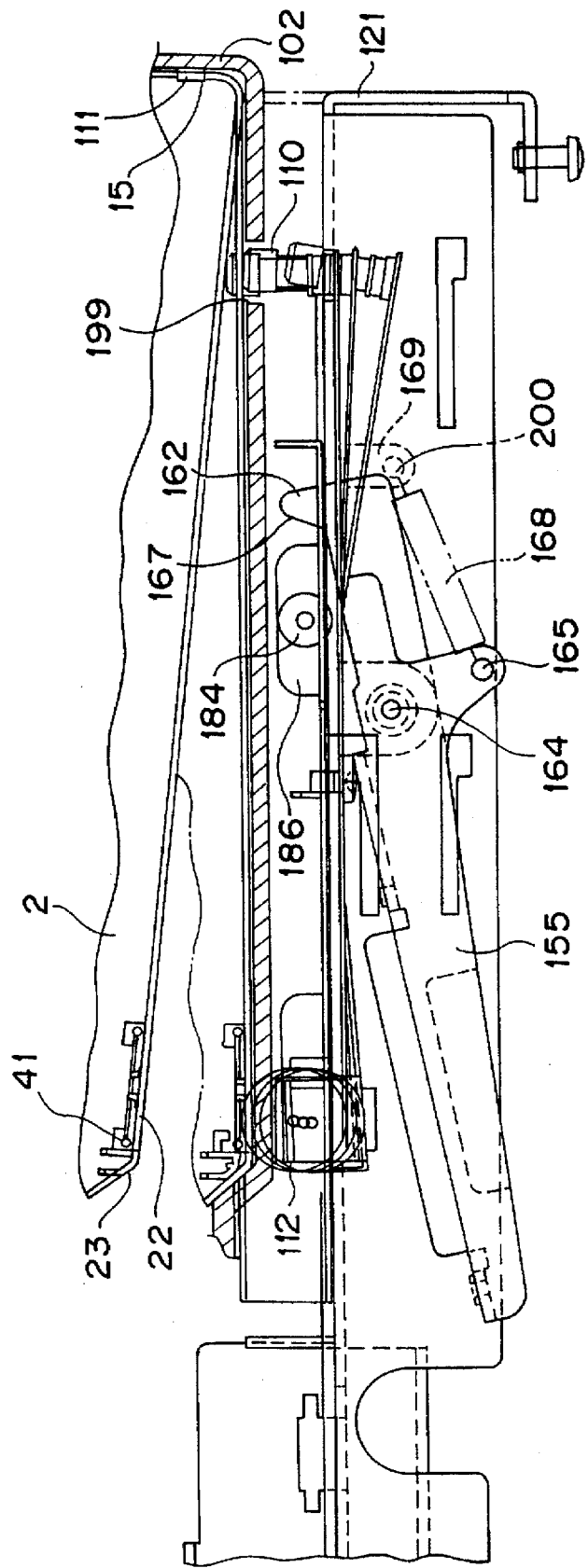
FIG. 26 is an enlarged front view showing the structure of essential portions of the station device as the electronic apparatus is being connected thereto.

The slider 175 has a pair of pawls 115, 115 for releasing the locked state of the slide shutter 22 of the tape recorder 1 by the lock members 23, 23 for opening the slide shutter 22. These pawls 115, 115 are formed at distal ends of a pair of lugs 179, 179 formed upright on the slider 175. Between these lugs 179, 179 is formed a cut-out 180. The lugs 179, 179 are set upright parallel to each other and are bent at upper edge portions thereof in opposite directions, that is in a direction away from each other. The slider 175 has the pawls 115, 115 protruded via through-holes formed in the casing 102 for facing the lateral side in the loading portion 109. When the slider 175 is slid towards the opposite lateral side, the pawls 115, 115 are intruded into the loading portion 109. If the pawls 115, 115 are intruded into the loading portion 109 when the outer casing 2 of the digital tape recorder 1 is loaded in the loading portion 109, the pawls 115, 115 are abutted against the tapered lower surfaces of the lock members 23, 23, as shown in FIG. 26, for moving the lock members 23, 23 upwards for releasing the locked state of the slide shutter 22 established by the lock members 23, 23. If intruded further into the loading portion 109, the pawls 115, 115 open the slide shutter 22. When the pawls 115, 115 have opened the slide shutter 22, hooked upper ends of the lugs 179, 179 are intruded via widened portions 50, 50 into the inside of the outer casing 2, with the lugs 179, 179 being intruded via the aperture 24 into the into the outer casing 2. Consequently, the upper hooked ends of the lugs 179, 179 are engaged with the inner sides of both edges of the aperture 24 for retaining the outer casing 2 on the loading portion 109 in cooperation with the engagement portions 111, 111.

Figure 16:
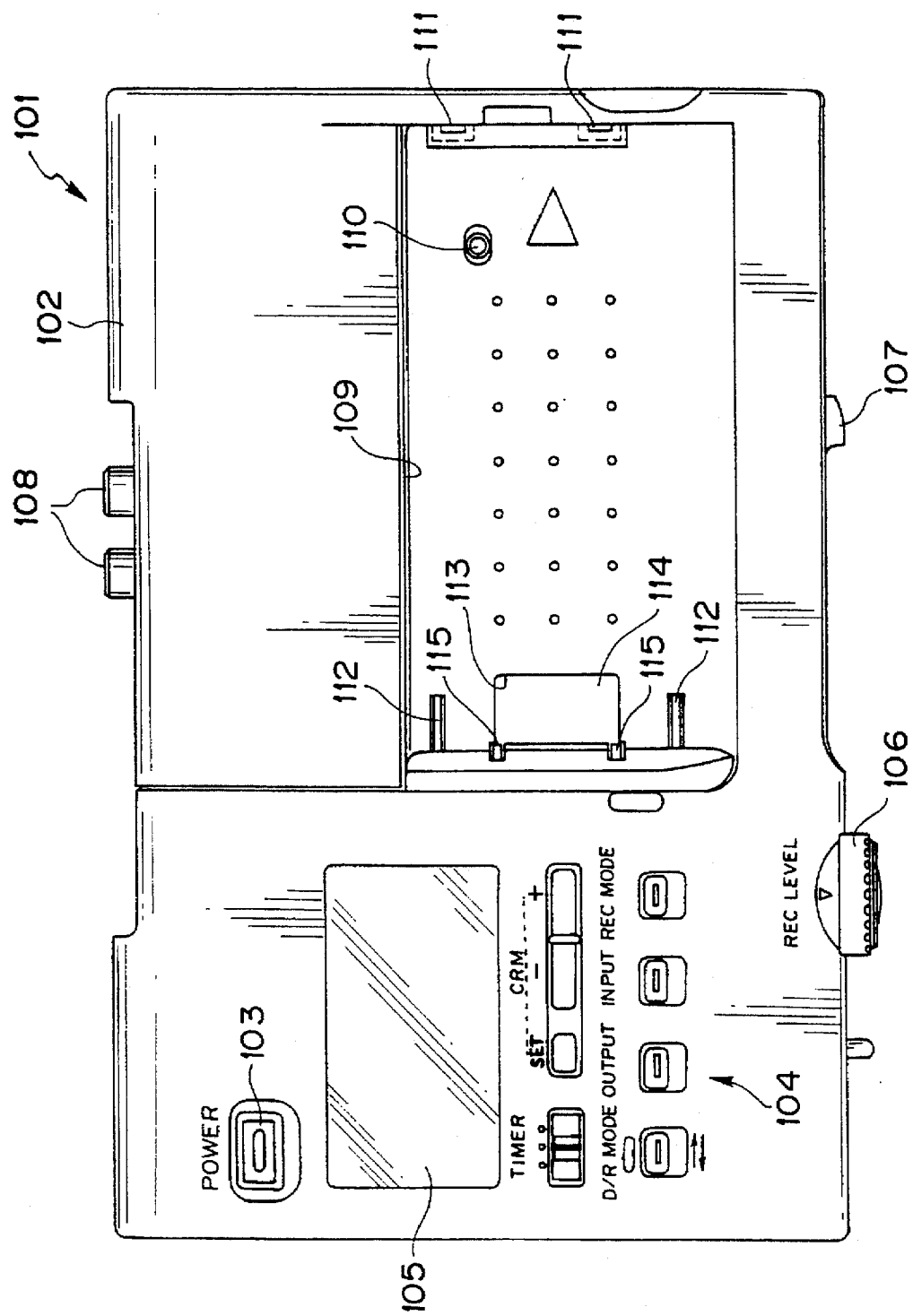
FIG. 16 is a plan view showing an arrangement of a station device according to the present invention.
Figure 17:
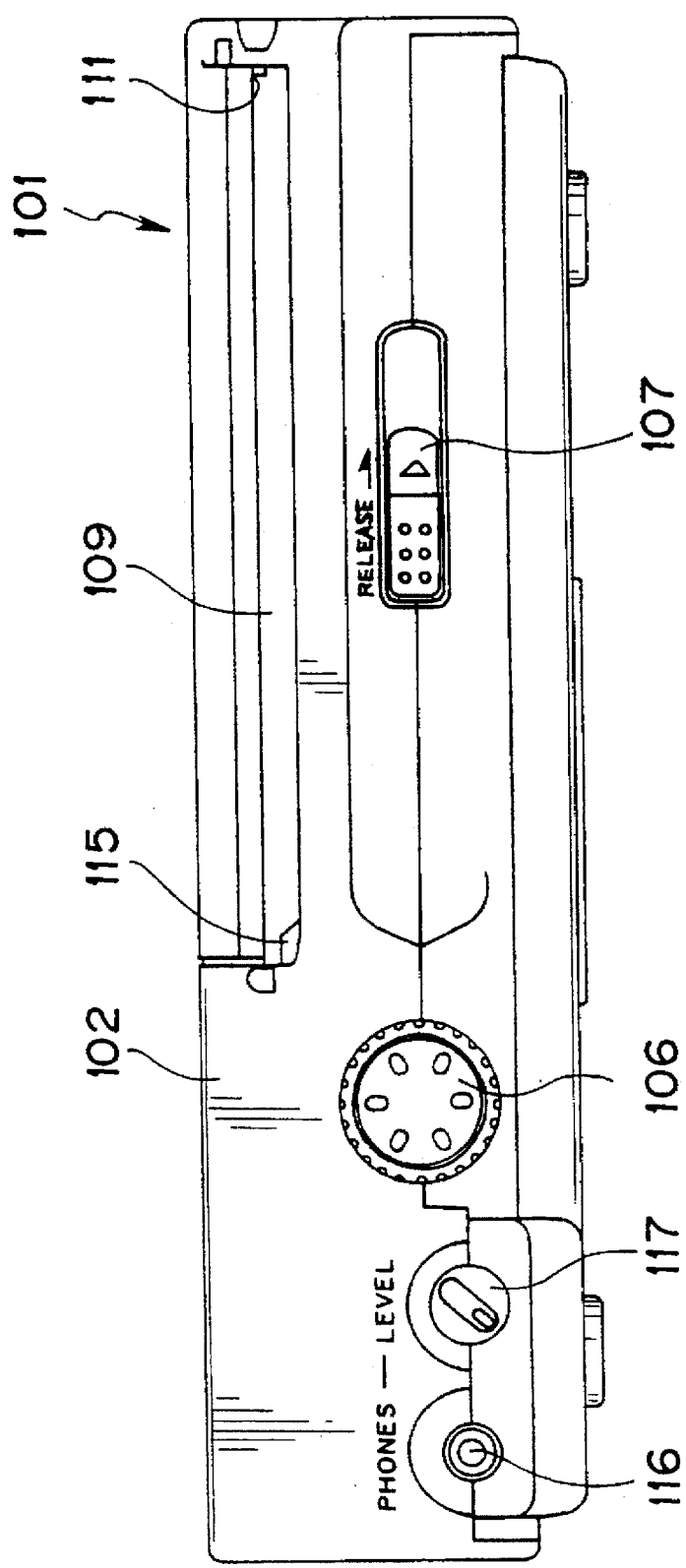
FIG. 17 is a front view showing the structure of the station device.
Figure 18:
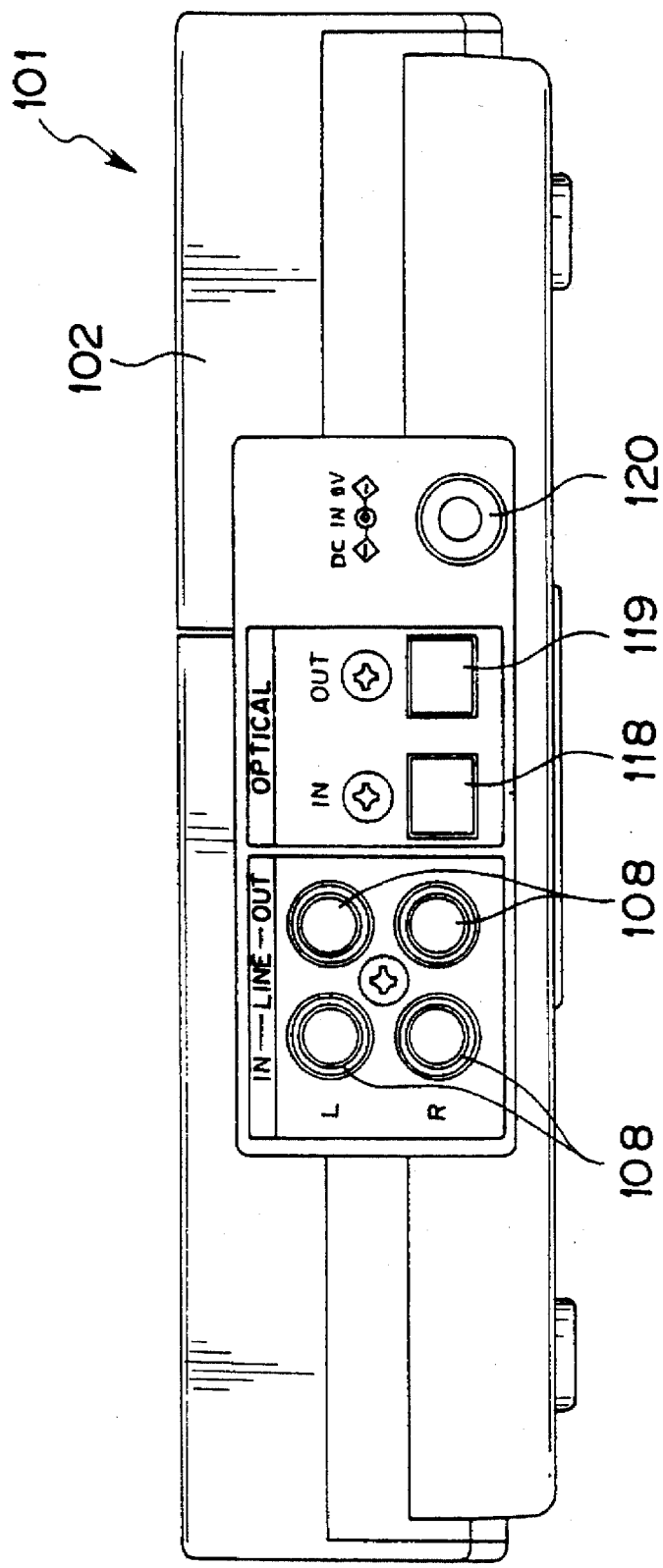
FIG. 18 is a back-side view showing the structure of the station device.
Figure 19:
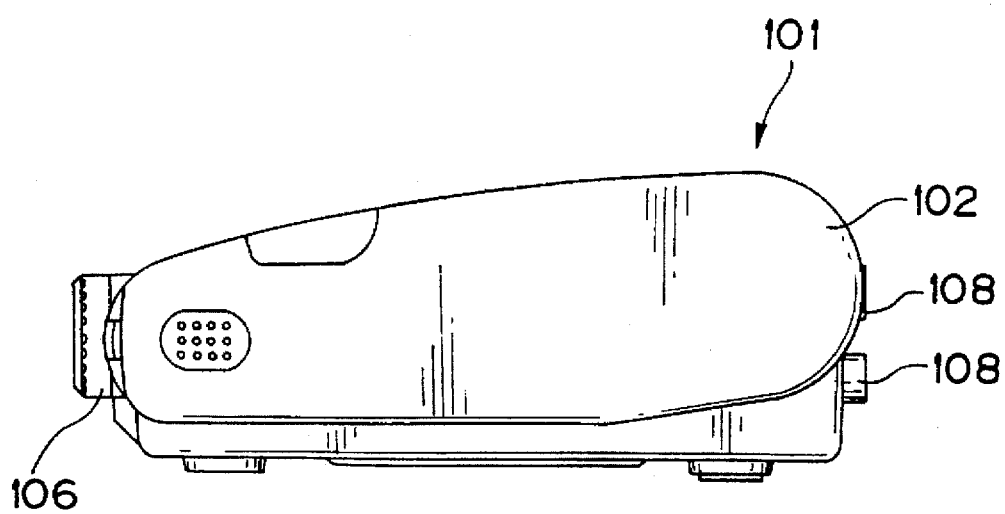
FIG. 19 is a side view showing the structure of the station device.
Figure 20:
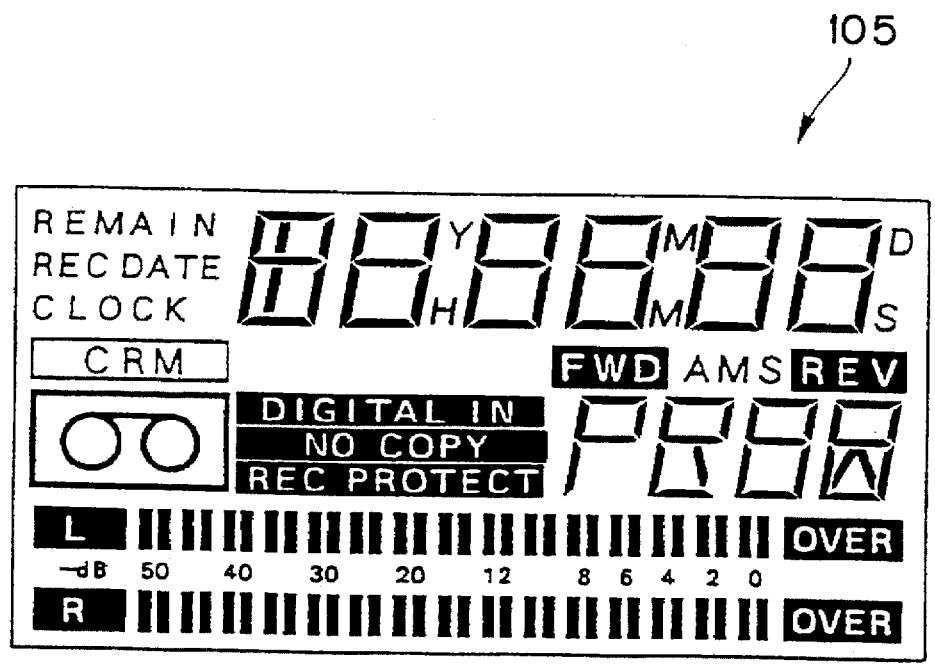
FIG. 20 is a plan view showing the structure of a display portion of the station device.
Figure 21:
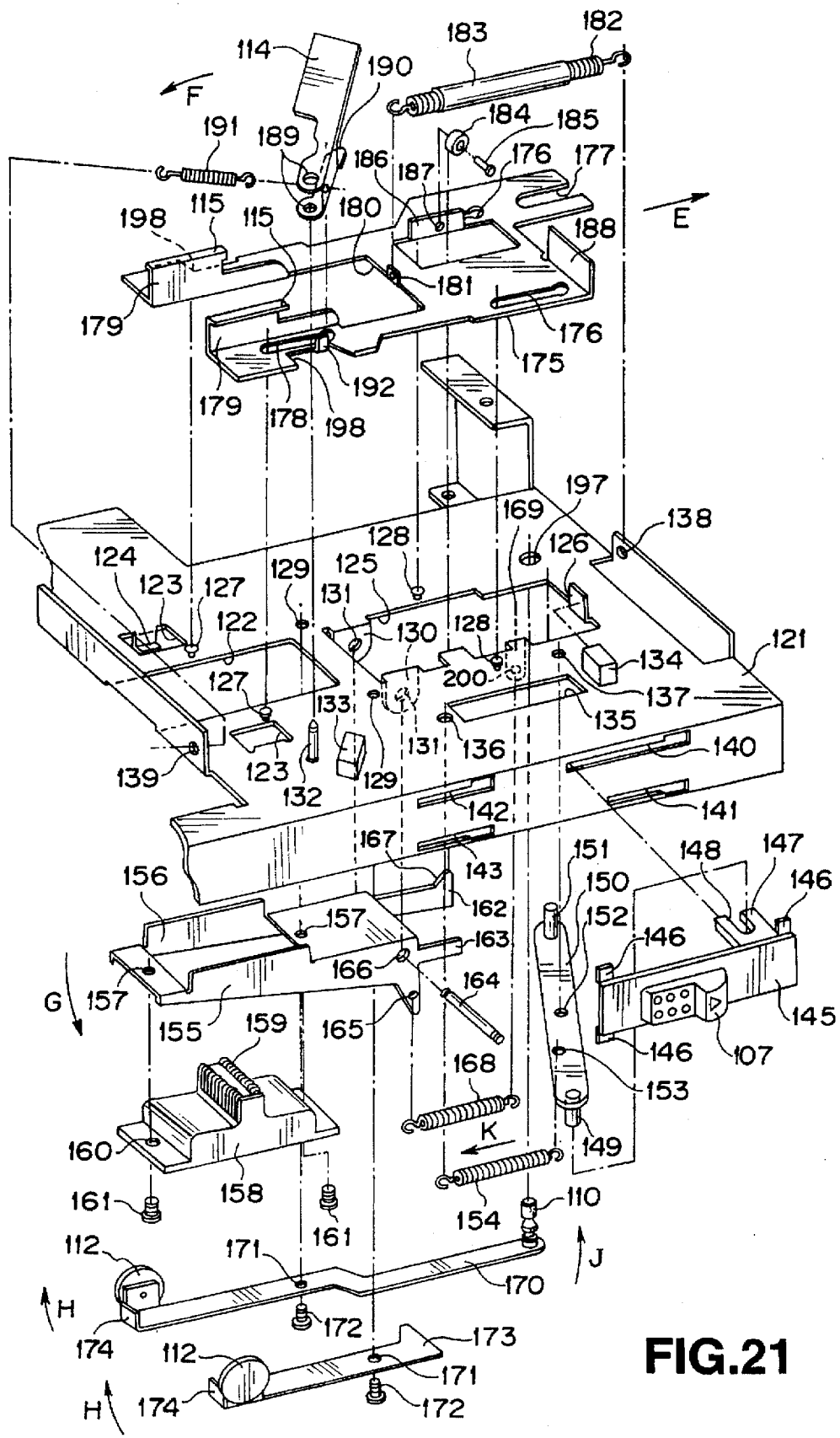
FIG. 21 is an exploded perspective view showing the structure of essential portions of the station device.
Figure 22:
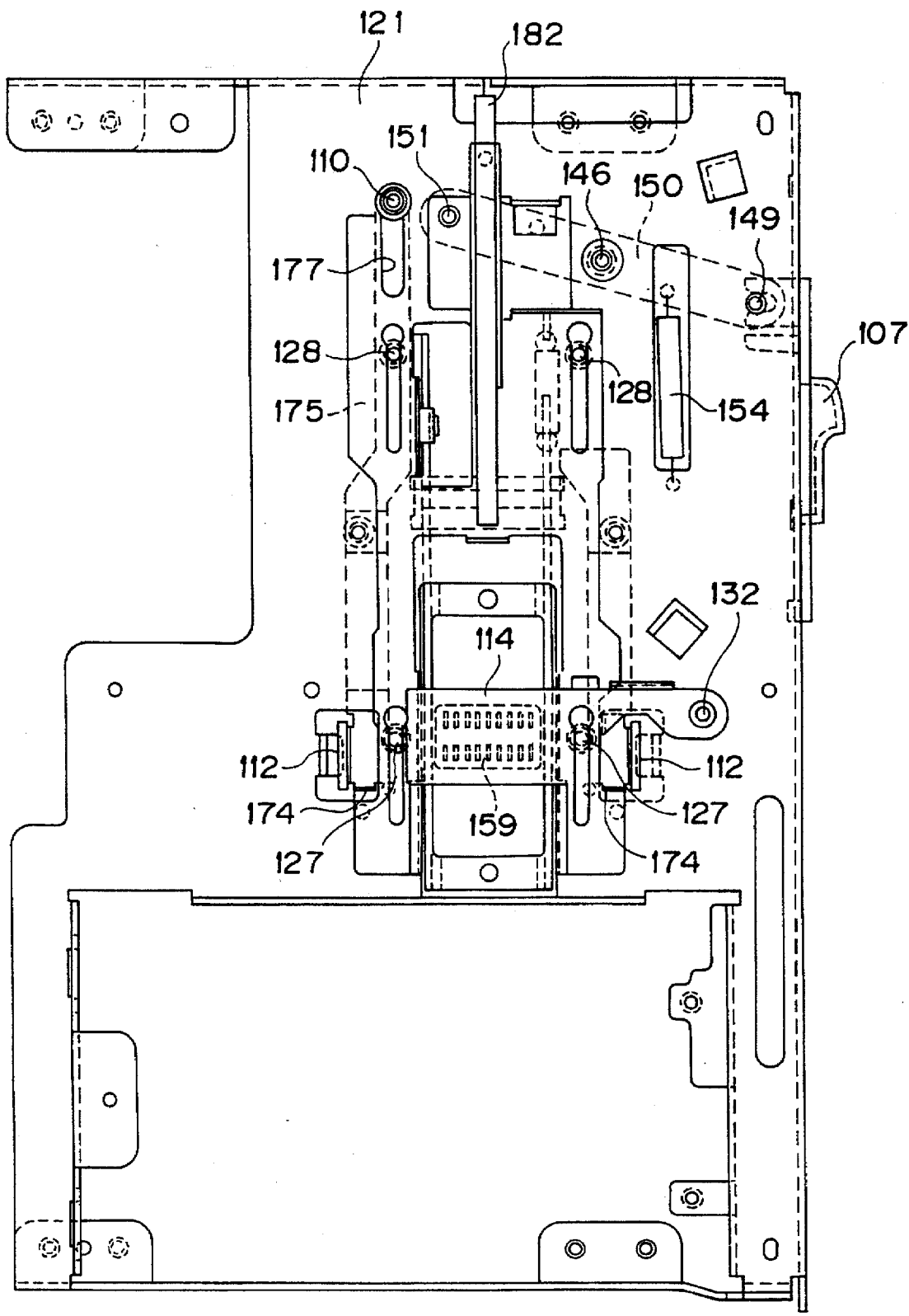
FIG. 22 is a plan view showing the structure of essential portions of the station device.
Figure 25:
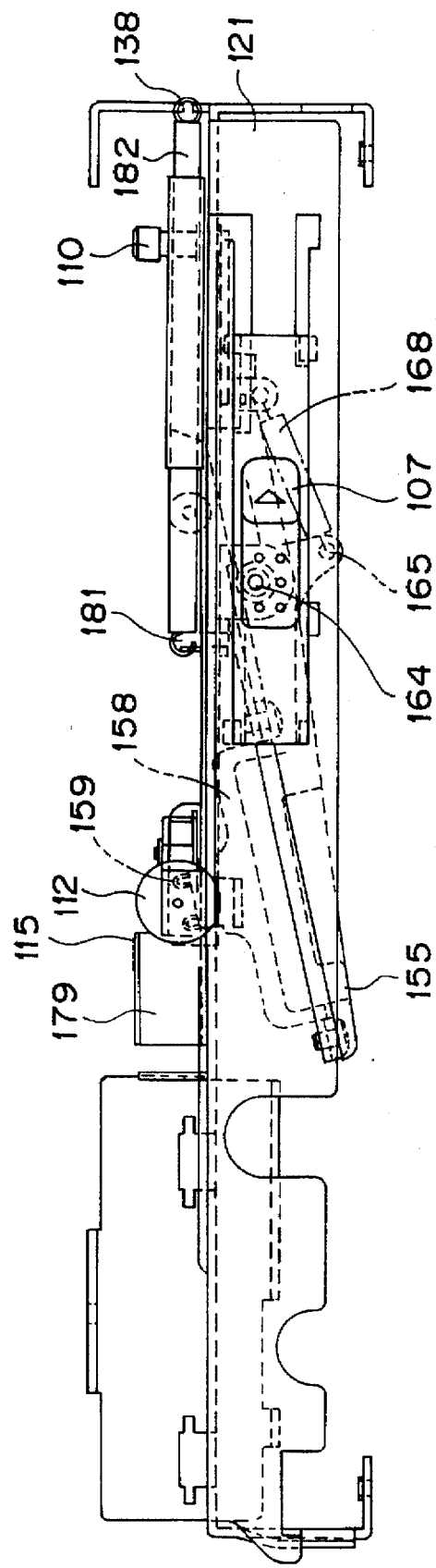
FIG. 25 is a front view showing the structure of essential portions of the station device.
Figure 27:
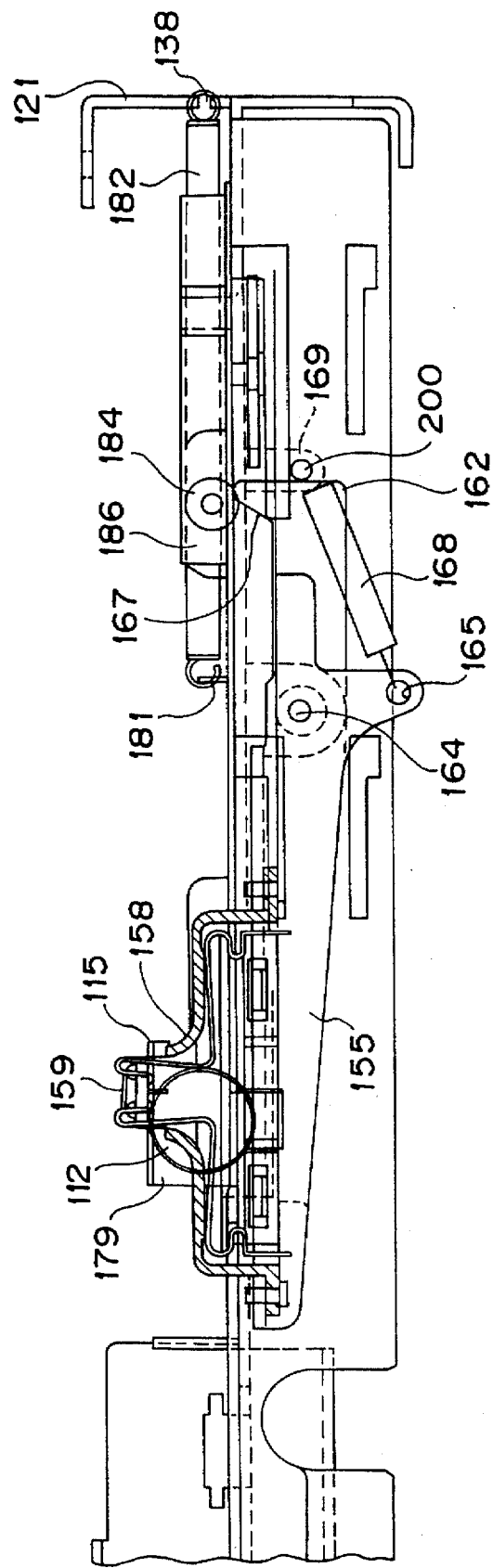
FIG. 27 is an enlarged front view showing the structure of essential portions of the station device as the electronic apparatus has been connected thereto.
Figure 28:
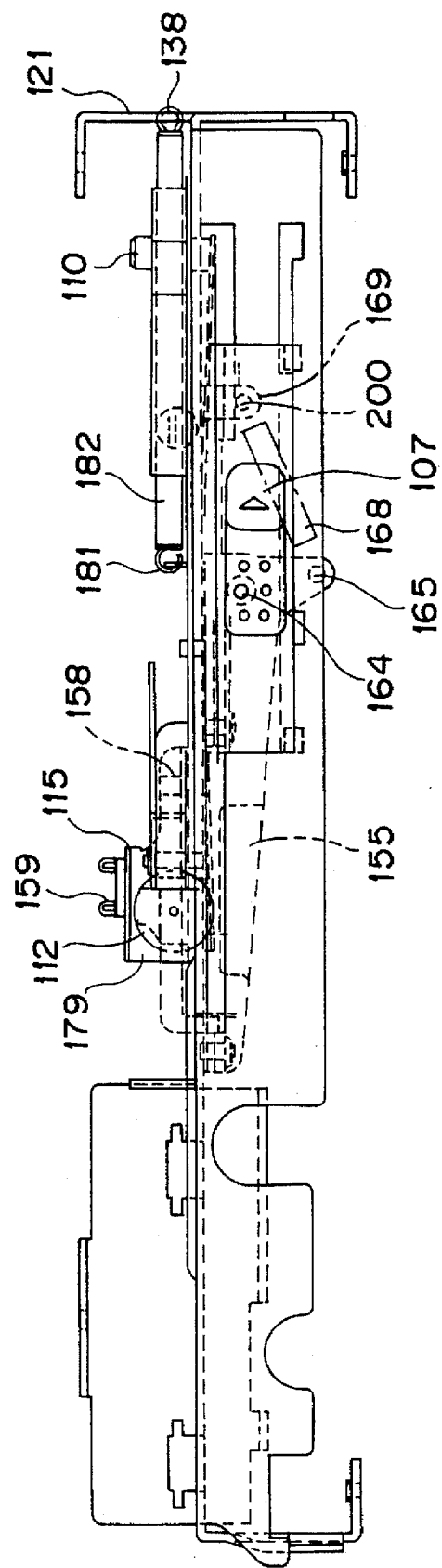
FIG. 28 is a front view showing the structure of essential portions of the station device as the electronic apparatus is connected thereto.
Figure 29:
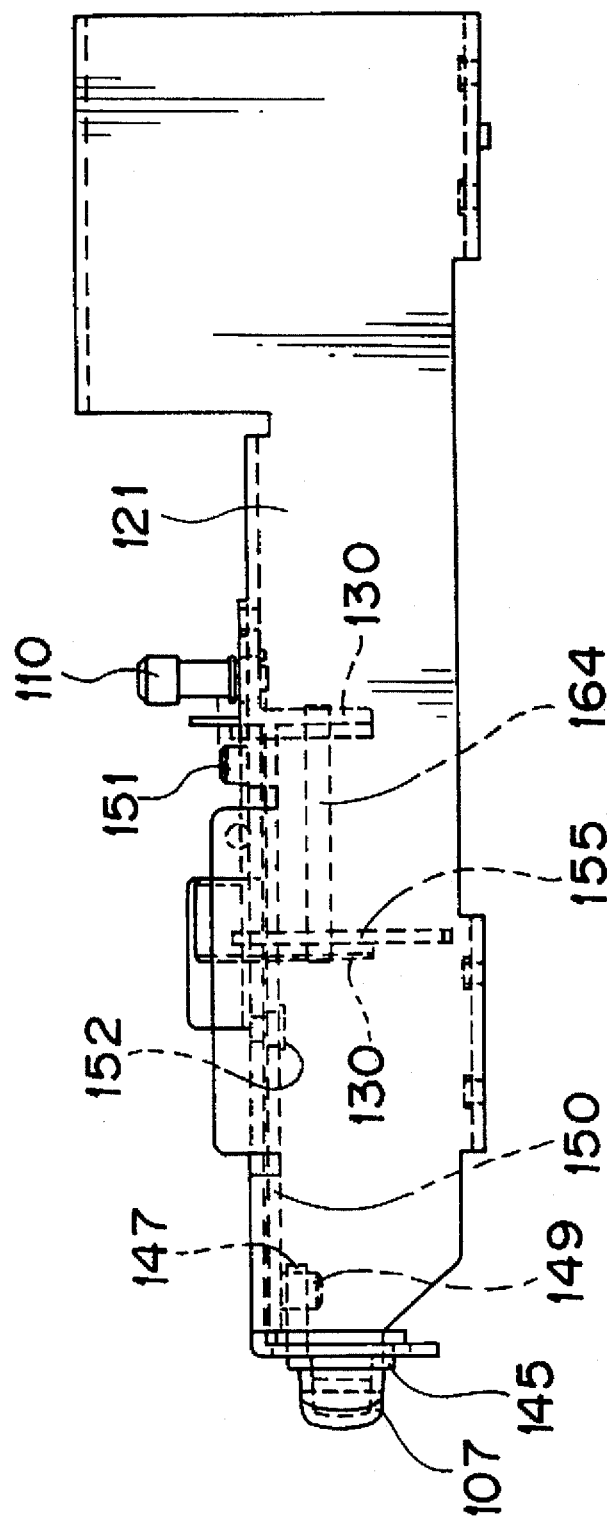
FIG. 29 is a side view showing the structure of essential portions of the station device.

On the lower surface of the chassis 21 is rotatably mounted a rotary arm 155, operating as a movement member, as shown in FIG. 25. This rotary arm 155 is supported at a proximal end thereof via a support shaft 164 introduced into a through-hole 166 in the proximal end thereof for rotation with respect to a pair of supporting pieces 130, 130 extending downwards at a mid portion of the chassis 121. The support shaft 164 has opposite ends supported in support holes 131, 131 formed in the supporting pieces 130, 130. A connection terminal 159 connected to each contact 51 of the tape recorder 1 is supported on the distal end of the rotary arm 155. The connection terminal 159 is connected to each contact 51 of the tape recorder 1. This connection terminal 159 is mounted on a substrate portion 158 and is supported on the rotary arm 155 by the substrate portion 158 being mounted on the distal end of the rotary arm 155. The substrate portion 158 has tapped holes 160 in opposite end portions and is mounted on the rotary arm 155 by screws 161, 161 which are engaged in these tapped holes 160 and in tapped holes 157, 157 of the rotary arm 155. The rotary arm 155 is rotated in a direction in which its distal end is directed upwards so that the rotary arm intrudes from below into one end portion of the interior of the loading portion 109 via a through-hole 122 formed at one lateral side of the chassis 121, a cut-out 180 formed in the slider 175 and a through-hole 113 formed in the outer casing 102, as shown in FIGS. 16, 21 and 27. The rotary arm 155 is rotated in a direction in which its distal end is directed downward so as to recede downward from the loading portion 109 via a through-hole 113 formed in the outer casing 102, as shown in FIGS. 16, 21 and 27. That is, the connection terminal 159 of the rotary arm 155 may be advanced or receded relative to the loading portion 109.

The range of rotation of the rotary arm 155 is limited so as to begin at a position in which the distal end of the rotary arm 155 abuts the lower surface of the chassis 121 and so as to be terminated at a position in which an abutment piece 163 protuberantly formed on the proximal end of the rotary arm 155 abuts the lower surface of the chassis 121.

When slid in a direction in which the pawls 115, 115 intrude into the loading portion 109, the slider 175 is rotated, via a cam 167 protuberantly formed towards the proximal end of the rotary arm 155, in a direction in which the connection terminal 159 intrudes into the loading portion 109. The cam 167 is protuberantly formed towards the proximal end of the rotary arm 155 and has its distal end inclined upwards. On the slider 175 is mounted a roll 184 facing the cam 167. The roll 184 is toroidally-shaped and is rotatably supported by a supporting shaft 185 set horizontally in a supporting opening 187 formed in a supporting piece 186 set upright on the slider 175. The slider 175 is biased by a tension coil spring 182, operating as a biasing member, in a direction in which the pawls 115 are intruded into the loading portion 109, as indicated by arrow E in FIG. 21. The tension coil spring 182 is mounted under tension between a retainer 181 on the slider 175 and a retainer 138 on the chassis 121.

The rotary arm 155 is biased by a tension coil spring 168 in a direction in which the connection terminal 159 recedes out of the loading portion 109, as indicated by arrow G in FIG. 21. This tension coil spring 168 is mounted under tension between a retainer 165 extending downward from the proximal end of the rotary arm 155 and a retainer 200 formed on the chassis 121.

The slider 175 has a pair of mating retention portions 198, 198 on one end portion. These mating retention portions 198, 198 are retained by retention pawls 174, 174, operating as retainers, for positioning the pawls 115, 115 at initial positions in which the pawls 115, 115 recede from the loading portion 109. The retention pawls 174, 174 are formed by bending the distal ends of the paired spring plates 170, 173 upwards. These spring plates 170, 173 are mounted by screws 172, 172 on the lower surface of the chassis 121 so that the pawls extend parallel to each other. These retention arms 174, 174 are biased by the spring plates 170, 174 upwards as indicated by arrow H in FIG. 21. These retention pawls 174, 174 protrude above the chassis 121 via a pair of through-holes 123, 123 formed in one lateral side of the chassis 121. On the distal ends of the spring plates 170, 174 are mounted detection plates 112, 112 operating as detection members. When the spring plates 170, 174 are at the initial position, these detection plates 112, 112 protrude via the through-holes 123, 123 in the chassis 121 to a position above the chassis 121 and are further protrude upwards from the bottom surface of the loading portion 109 via slit-like through-holes formed in the casing 102 in the bottom surface towards a lateral side of the loading portion 109. When the tape recorder 1 is set on the loading portion 109, the detection plates 112, 112 are moved by the lateral side of the tape recorder 1 in the vicinity of the contacts 51 thereof so that the retention pawls release the slider.

Figure 30:
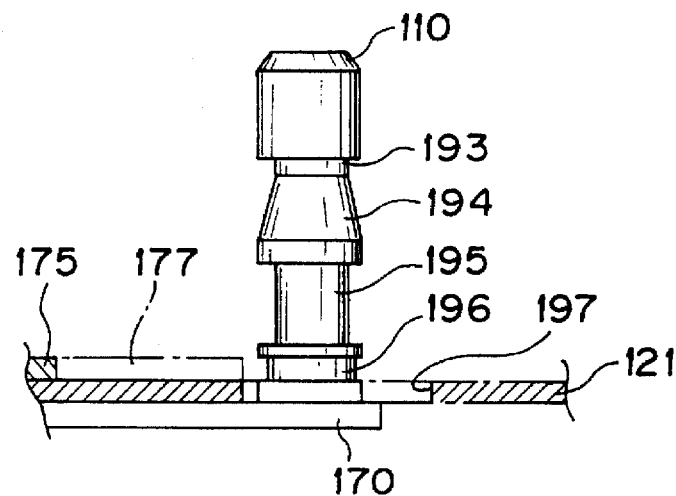
FIG. 30 is an enlarged side view showing the structure of an opposite side detection pin of the station device.
Figure 31:
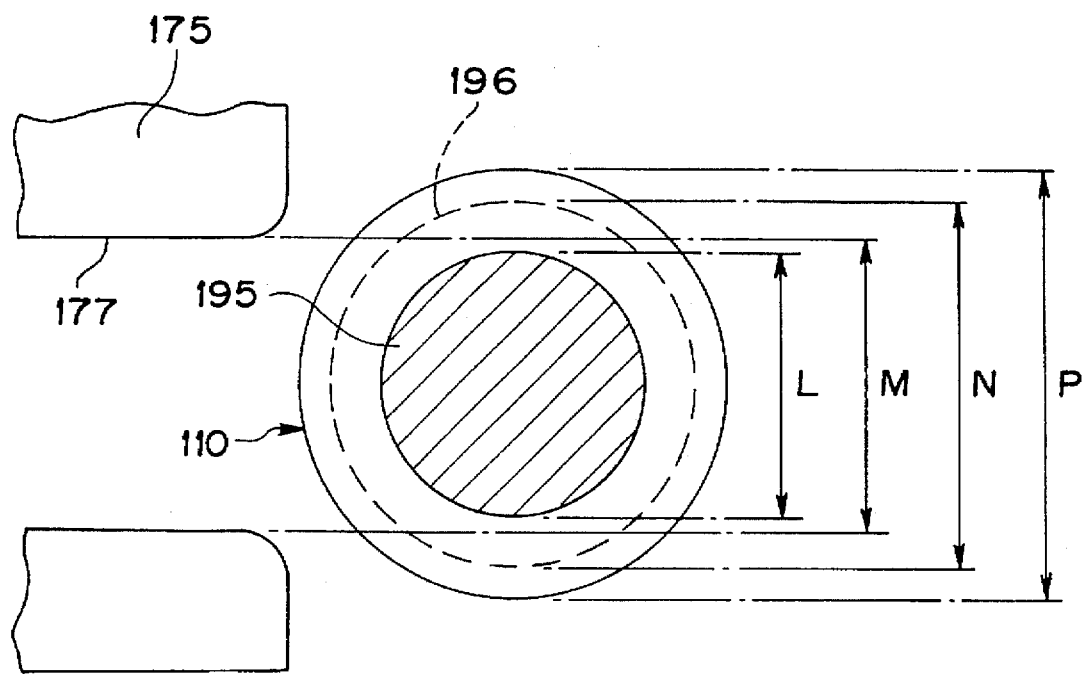
FIG. 31 is an enlarged plan view showing the structure of an opposite side detection pin of the station device.
Figure 32:
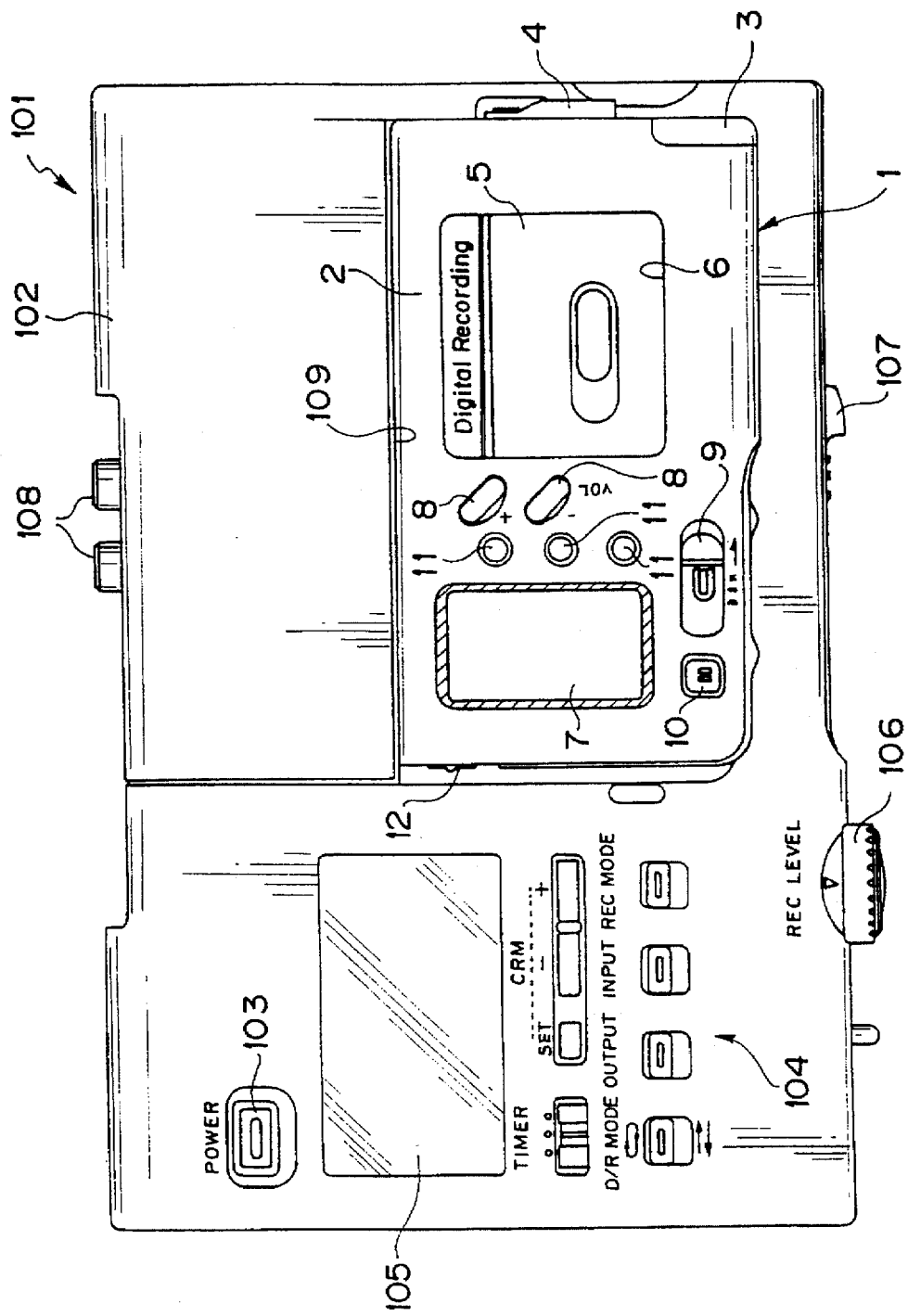
FIG. 32 is a plan view showing the state in which the electronic apparatus is connected to the station device.
Figure 33:
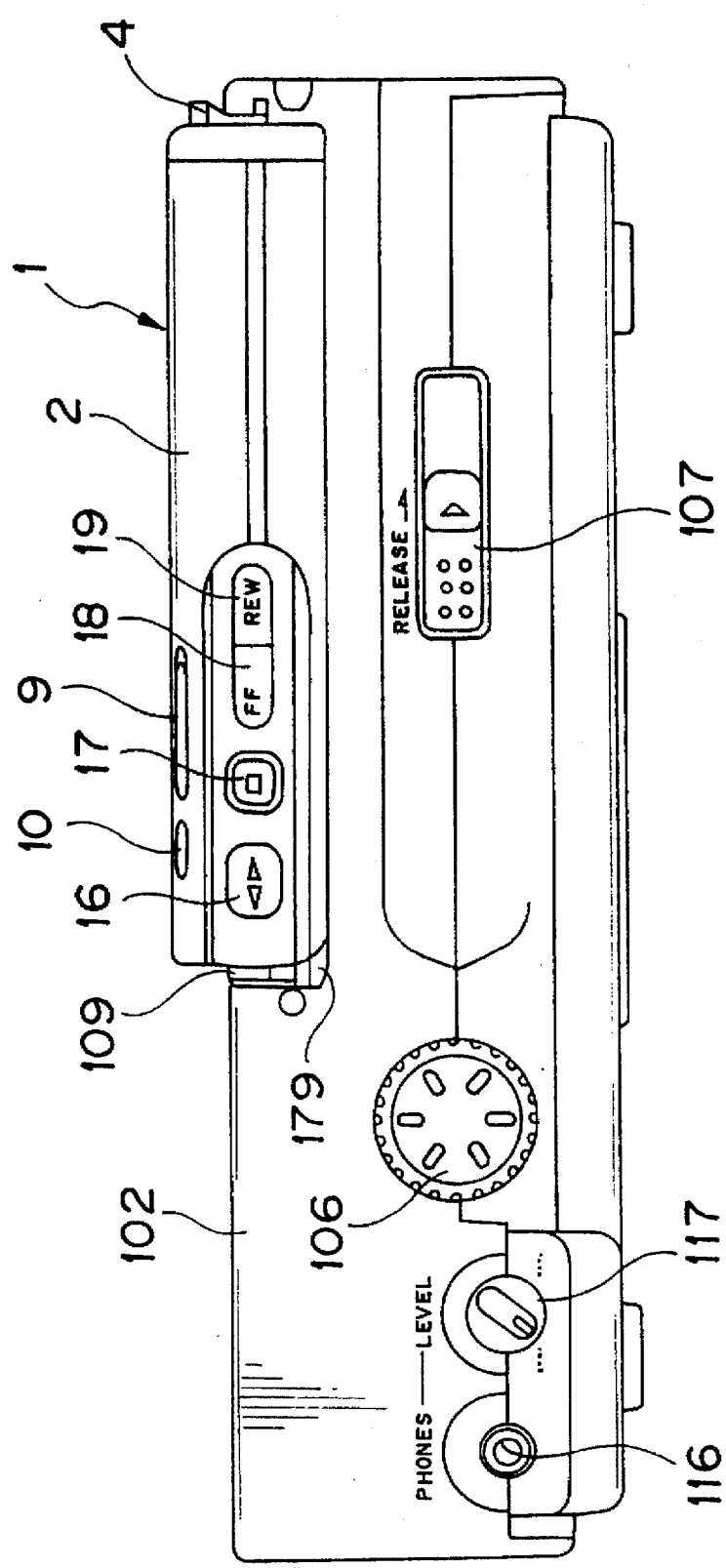
FIG. 33 is a front view showing the state in which the electronic apparatus is connected to the station device.
Figure 34:
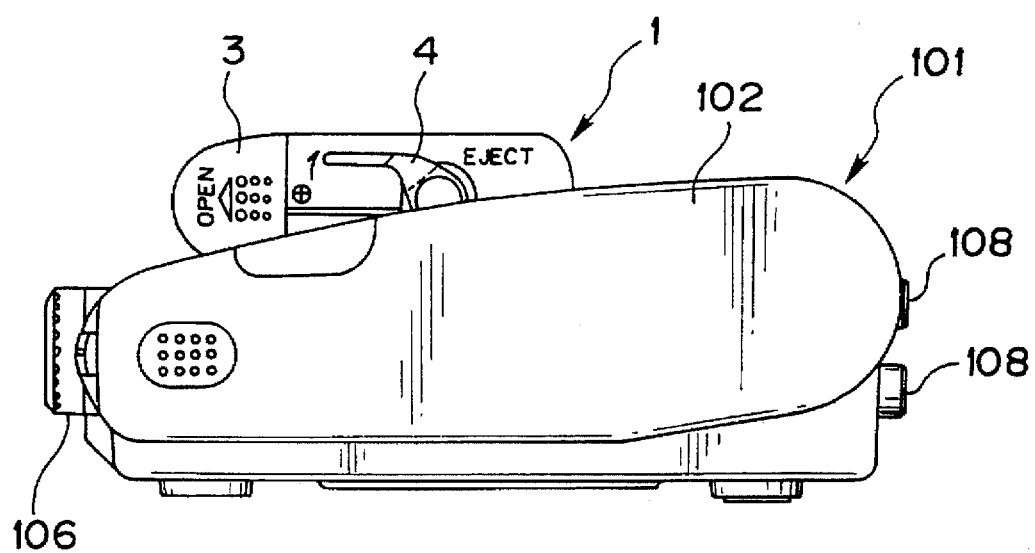
FIG. 34 is a front view showing the state in which the electronic apparatus is connected to the station device.

The spring plate 170 extends on the opposite lateral side of the chassis 121 and a detection pin 110 operating as a detection member and a retention member is set on the distal end on the lateral side of the chassis. This detection pin 110 protrudes above the bottom portion of the loading portion 109 via a through-hole 197 formed in the chassis 121 and another through-hole formed in the opposite lateral side of the bottom portion of the loading portion 109. The detection pin 110 is biased upwards under the bias of the spring plate 170 as indicated by arrow J in FIG. 21. The detection pin 110 is a cylindrically-shaped pin provided on the spring plate 170 for extending upwards, as shown in FIGS. 30 and 31, and has a constant diameter as indicated by arrow L pin FIG. 31. The detection in 110 has, at a mid height level position thereof, a first reduced-diameter portion 193 smaller in diameter than the diameter of the detection pin 110 indicated by arrow L in FIG. 31. The lower portion towards the proximal end of the first reduced-diameter portion 193 is formed as a tapered portion 194 enlarged gradually in diameter in a downward direction. The lower part of the tapered portion 194 is formed with a second reduced-diameter portion 195. The second reduced-diameter portion 195 is approximately of the same diameter as the first reduced-diameter portion 193.

On the lower side of the second reduced-diameter portion 195 is formed a third reduced-diameter portion 196 smaller in diameter than the detection pin 110 as indicated by arrow N in FIG. 31. This third reduced-diameter portion 196 is larger in diameter than the second reduced-diameter portion 195. In the initial state in which the spring plate 170 is not deflected, the third reduced-diameter portion 196 is of a height level such that it extends along the upper surface of the chassis 121.

The opposite lateral side of the slider 175 is formed with a slit-like cut-out 177 in register with the detection pin 110, as shown in FIG. 31. The cut-out 177 has a constant width as indicated by arrow M in FIG. 31. This slit-like cut-out 177 is opened towards the opposite lateral side and has the open end faced by the detection pin 110. The slit-like cut-out 177 is larger in width than the diameter of the second reduced-diameter portion 195 and narrower in width than the diameter of the third reduced-diameter portion 196, as shown in FIG. 31. Therefore, if, with the spring plate 170 in the initial state, the slider 175 is slid towards the opposite lateral side, both corner portions of the open end of the slit-like cut-out 177 are abutted against the third reduced-diameter portion 196 thus halting the slider 175. Since both corner portions of the open end of the slit-like cut-out 177 are sandwiched between upper and lower edges of the third reduced-diameter portion 196, the detection pin 110 is prohibited from being moved downwards.

The chassis 121 has a release arm 150 rotatably mounted thereon. The release arm 150 is positioned on the lower surface of the chassis 121 and is rotatably supported by passing a support shaft 137 set on the chassis 121 through an opening 152 formed at a mid portion thereof. This release arm 150 has at one end a release pin 151 facing the opposite lateral side of the slider 175. The opposite end of the release arm 150 has a coupling pin 149 mounted thereon. This coupling pin 149 is rotatably coupled to a release slider 145 slidably mounted on the forward edge of the chassis 121.

The release slider 145 has plural supporting pawls 146 which are passed through supporting slits 140, 141, 142 and 143 formed in the chassis 121 for being slid laterally with respect to the chassis 121. The release slider 145 has a coupling piece 147 which is formed with a coupling groove 148 in which is coupled the coupling pin 149. The release slider 145 has a release button 107 on its front side. The release arm 150 is rotationally biased by a tension coil spring 154 in a direction in which the release pin 151 is spaced apart from the slider 175, as indicated by arrow K in FIG. 21. The tension coil spring 154 is mounted under tension between a retainer 153 formed on the release slider 150 and another retainer 136 formed on the chassis 121.

The chassis 121 carries a shutter member 114 overlying the connection terminal 159 when the slider 175 is retained by the retention pawls 174, 174. The shutter member 114 has a supporting opening 189 on its proximal end into which a supporting pin 132 set on the chassis 121 is introduced for rotatably supporting the shutter member 114. The distal end portion of the shutter member 114 is formed as a flat-plate-shaped shutter plate portion. The shutter member 114 has a coupling piece 190 at its mid portion. The slider 175 is formed with a coupling protrusion 192 in register with the coupling piece 190. The shutter member 114 is rotationally biased by a tension coil spring 191 in a direction of overlying the connection terminal 159 as indicated by arrow F in FIG. 21. The tension coil spring 191 is mounted under tension between a retainer formed on the shutter member 114 and a retainer 139 formed on the chassis 121. When the slider 175 is slid under the bias of the tension coil spring 182, the shutter member 114 is rotated via the coupling protrusion 192 and the coupling piece 190 in association with the sliding of the slider 175 for exposing the connection terminal 159 to outside.

In the above station device 101, if the tape recorder 1 is set on the loading portion 109, with the engagement portions 111, 111 being engaged and fitted in the engagement openings 15, 15, the detection pin 110 is thrust downwards by the opposite lateral side of the outer casing 2 of the tape recorder 1. At this time, the open end of the slit-like recess 177 of the slider 175 faces the second reduced-diameter portion of the detection pin 110.

If the lateral side of the outer casing 2 of the tape recorder 1 is loaded on the loading portion 109, the detection plates 112, 112 are also thrust downwards, thus releasing the state of retention of the slider by the retention pawls 174, 174. The locked state of the slide shutter 22 by the lock members 23, 23 is also released at this time by the pawls 115, 115. Thus the slider 175 is slid by the tension coil spring 182, as indicated by arrow Q in FIG. 23, for opening the slide shutter 22 by the pawls 115, 115. The rotary arm 155 is then rotated so that the connection terminal 159 is connected to respective contacts 51 of the tape recorder 1. The tape recorder 1 is held at this time in position by the engagement portions 111, 111 and by the lugs 179, 179, as shown in FIGS. 32 to 34, 21 and 26.

Figure 23:
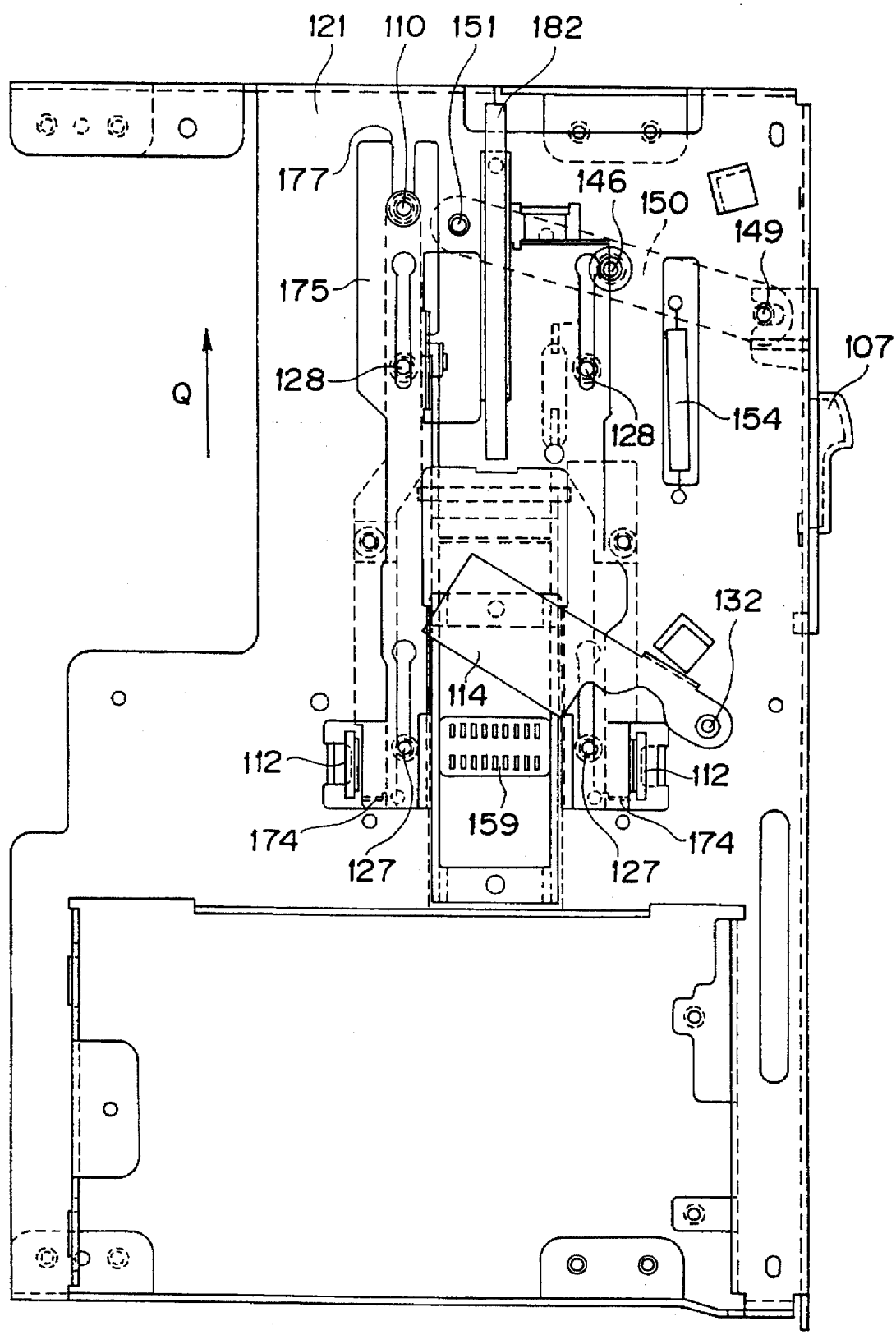
FIG. 23 is a plan view showing the structure of essential portions of the station device with the electronic apparatus connected thereto.

When rotated to a position of exposing the connection terminal 159 upwards, the shutter member 114 has its rotation halted by a cushioning member 133 arranged on the chassis 121, as shown in FIG. 23.

When slid by the tension coil spring 182, the slider is halted by a wall section 188 set upright on the opposite lateral side abutted against a cushion 133 provided on the chassis 121.

With the station device 101, a variety of electronic circuits are connected to the connection terminal 159 so that information signal exchange with and power supply to the tape recorder 1 occur via the contacts 51. The present station device 101 has a power source switch 103, an actuating switch 104, input/output terminals for information signals 116, 108, 118, 119, an external power source supply terminal 120, a volume knob 106 and a display unit 105.

Figure 24:
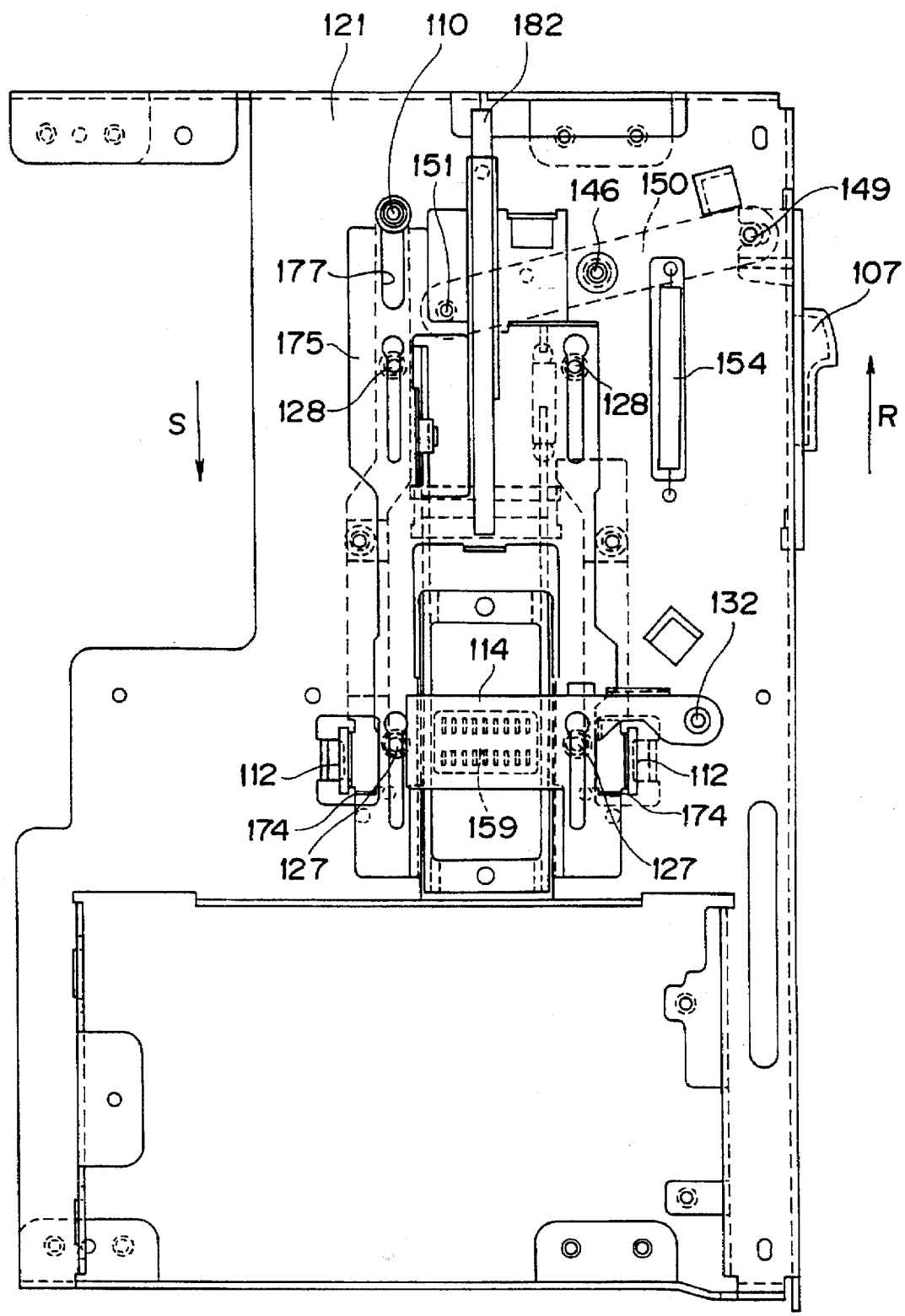
FIG. 24 is a plan view showing the structure of essential portions of the station device as the electronic apparatus connected to the station device is being disconnected therefrom.

In the above station device 101, the release slider 145 is slid by the release knob 107 and the release arm 150 is turned against the rotational bias of the tension coil spring 154, as indicated by arrow R in FIG. 24. Thus the slider 175 may be reset to the original position by the release pin 151 as indicated by arrow S in FIG. 24. The slider 175, restored to the initial position, is retained by the retention pawls 174, 174 and thereby held in the initial position. By the slider 175 being reset to the initial position, the slide shutter 22 of the tape recorder 1 is in the aperture closure position and locked by the lock members 23, 23 to permit ejection of the tape recorder 1 from the loading portion 109.

In the station device 101, since two detection plates 112, 112 are provided at separate portions, retention of the slider 175 by the retention pawls 174, 174 is not released if one of the detection plates is thrust but the other detection plate 112 is not thrust. Thus, retention of the slider 175 is not released if the tape recorder 1 is loaded in a tilted position with respect to the loading portion 109.

Also, in the station device 101, since the detection pin 110 is provided at a position of being thrust by the opposite lateral side of the tape recorder 1 set on the loading portion 109, the detection pin 110 prohibits the sliding of the slider 175 if both the detection plates 112, 112 are thrust but the detection pin 110 is not thrust. Thus, if the tape recorder 1 is loaded in a tilted state on the loading portion 109, the slider 175 is not slid. That is, when the tape recorder 1 is loaded in position in the loading portion 109 and all of the detection pin 110 and the detection plates 112, 112 are thrust by the tape recorder 1, the locked state of the slide shutter 22 by the lock members 23, 23 is released by the pawls 115, 115 so that the slider 175 is slid by the tension coil spring 182 for opening the slide shutter by the pawls 115, 115 for moving the rotary arm 155 via cam 167 for connecting the connection terminal 159 to the contacts 51 of the tape recorder 1.

Although the foregoing description has been made of a tape recorder as an example of the electronic apparatus connected to the station device, the present invention may also be applied to any electronic apparatus adapted for exchanging information signals with or supplying the power to external equipment, such as a disc player or a radio receiver.

In the station device for the electronic apparatus according to the present invention, the slider has pawls for unlocking a slide of an electronic apparatus, such as a tape recorder, with respect to a slide shutter, for opening the slide shutter, and is mounted for sliding in the direction of reciprocating the pawls within the loading portion. When the electronic apparatus is loaded on the loading portion and a detection member is detected by the electronic apparatus, the locked state of the slide shutter by the lock members is released by the pawls so that the slide shutter is moved by a biasing member and a movement member is moved by a cam. The connection terminal mounted on the movement member is connected to a contact of the electronic apparatus. Consequently, with the station device for the electronic apparatus, the connection terminal is connected to the contact when the electronic apparatus is loaded in position in the loading portion.

If, in the above station device, a shutter member is provided which overlies the connection terminal when the slider is retained by the retention member and which is moved in association with movement of the slider under the biasing force supplied by a biasing member for exposing the connection terminal to outside, the connection terminal may be protected during nonconnection time.

If, in addition, there is provided another detection member of the above station device at a position thrust by the opposite side portion of the electronic apparatus loaded on the loading portion, such that retention of the slider by the retention members is adapted to be released when all of the detection members have been thrust, the electronic apparatus may be positioned more correctly with respect to the loading portion.

What is claimed is:

1. A station device for electronic apparatus, said electronic apparatus having a terminal portion for connection to the station device and opening/closing means for opening or closing said terminal portion, said station device comprising:

a loading portion on which said electronic apparatus is loaded;

a connection portion provided on said loading portion and adapted to be connected to said terminal portion of the electronic apparatus;

detection means for detecting the loading of the electronic apparatus on said loading portion; and actuating means for moving said opening/closing means of said electronic apparatus in a direction of opening said terminal portion based upon the results of detection from said detection means;

said actuating means also moving said connection portion to a connection position with said terminal portion, thereby actuating said connection portion;

wherein said actuating means includes a first movement member given a forward movement by said detection means for moving the opening/closing means of said electronic apparatus in a direction of opening said terminal portion and a second movement member for moving said connection portion in a direction of connecting said connection portion with said terminal portion by the forward movement of said first movement member.

2. The station device for electronic apparatus as claimed in claim 1 further comprising opening/closing means for opening/closing said connection portion, said opening/closing means for opening/closing said connection portion being actuated by a forward movement of said actuating means in a direction of opening said connection portion.

3. A station device for electronic apparatus, said electronic apparatus having a terminal portion for connection to the station device and opening/closing means for opening or closing said terminal portion, said station device comprising:

a loading portion on which said electronic apparatus is loaded;

a connection portion provided on said loading portion and adapted to be connected to said terminal portion of the electronic apparatus;

detection means for detecting the loading of the electronic apparatus on said loading portion; and actuating means for moving said opening/closing means of said electronic apparatus in a direction of opening said terminal portion based upon the results of detection from said detection means;

said actuating means also moving said connection portion to a connection position with said terminal portion, thereby actuating said connection portion;

further comprising release operating means for causing backward movement of said first movement member for moving said connection portion by said second movement means in a direction of releasing connection with said terminal portion.

4. The station device for electronic apparatus as claimed in claim 3 wherein, when the release operating means is actuated for causing backward movement of said first movement member, said first movement member is held at a backward movement terminal position by said detection means.

5. The station device for electronic apparatus as claimed in claim 4 wherein said detection means includes at least one detection member rotated by the loading of the electronic apparatus on said loading portion and wherein said detection means includes a portion actuated by said electronic apparatus and a holding portion engaged with said first movement member for holding the first movement member at the backward movement terminal position.

6. A station device for electronic apparatus, said electronic apparatus having a terminal portion for connection to the station device, opening/closing means for opening or closing said terminal portion, and locking means for locking said opening/closing means at a position of closing said terminal portion, said station device comprising:

a main body having a loading portion for loading said electronic apparatus therein, said main body having input/output means for data input/output at least between the electronic apparatus loaded on said loading portion and external equipment;

a connection portion provided on said loading portion and adapted to be connected to said terminal portion of the electronic apparatus;

detection means for detecting the loading of the electronic apparatus on said loading portion;

actuating means responsive to said detection means for causing the locking means to release the locked state of the opening/closing means of the electronic apparatus and for moving said opening/closing means to open said terminal portion; and lift means for raising/lowering said connection portion between an upper position connecting to the terminal portion of said electronic apparatus and a lower position disconnected from said terminal portion, said lift means being operatively associated with said movement of the opening/closing means of the electronic apparatus to open said terminal portion for raising said connection portion to a position of being connected to said terminal portion.

7. The station device for electronic apparatus as claimed in claim 6 further comprising opening/closing means for opening/closing said connection portion, said opening/closing means for opening/closing said connection portion being actuated by the moving of said actuating means to open said terminal portion.

8. The station device for electronic apparatus as claimed in claim 6 wherein said actuating means includes a movement member given a forward movement by said detection means for moving the opening/closing means of the electronic apparatus in a direction of opening the terminal portion.

9. The station device for electronic apparatus as claimed in claim 8 further comprising release operating means for causing backward movement of said movement member for causing said lift means to move said connection portion to said lower position.

10. The station device for electronic apparatus as claimed in claim 9 wherein, when the release operating means is actuated for causing backward movement of said movement member, said movement member is held at a backward movement terminal position by said detection means.

11. The station device for electronic apparatus as claimed in claim 10 wherein said detection means includes at least one detection member rotated by the loading of the electronic apparatus on said loading portion and wherein said detection member includes an actuated portion actuated by said electronic apparatus and a holding portion engaged with said movement member for holding the movement member at the backward movement terminal position.

12. Electronic apparatus comprising:

a main body;

a terminal portion provided in said main body and adapted to be connected to a connecting portion of a device on which said electronic apparatus is loaded;

an aperture formed in said main body for exposing said terminal portion to outside;

opening/closing means for opening/closing said aperture, said opening/closing means being slidable between a position of opening said aperture and a position of closing said aperture with respect to said main body; and locking means for locking said opening/closing means at a position closing said aperture;

further comprising an internal power source, a power source terminal supplied with electric power from outside, and switching means for switching from said internal power source to an external power source connected to said power source terminal when said opening/closing means is moved to a position of opening said aperture.

13. The electronic apparatus as claimed in claim 12 wherein said opening/closing means has an operating portion for switching said switching means.

* * * * *